(12) United States Patent
Vyas et al.

(10) Patent No.: US 7,968,251 B2
(45) Date of Patent: Jun. 28, 2011

(54) ELECTRICAL CONTACT ELEMENT AND BIPOLAR PLATE

(75) Inventors: Gayatri Vyas, Rochester Hills, MI (US); Hubert A Gasteiger, Rochester, NY (US); Youssef Mikhail, Sterling Heights, MI (US); Ilona Busenbender, Rheinbreitbach (DE)

(73) Assignee: GM Global Technology Operations LLC, Detroit, MI (US)

( * ) Notice: Subject to any disclaimer, the term of this patent is extended or adjusted under 35 U.S.C. 154(b) by 1290 days.

(21) Appl. No.: 10/689,001

(22) Filed: Oct. 20, 2003

(65) Prior Publication Data

US 2004/0081881 A1  Apr. 29, 2004

Related U.S. Application Data

(63) Continuation of application No. 10/087,677, filed on Mar. 1, 2002, now abandoned, and a continuation of application No. 10/004,322, filed on Oct. 25, 2001, now abandoned.

(30) Foreign Application Priority Data

Nov. 24, 2000 (DE) .................................. 100 58 337

(51) Int. Cl.
*H01M 4/02* (2006.01)
(52) U.S. Cl. ........ 429/523; 429/532; 429/508; 429/454; 429/479
(58) Field of Classification Search .................... 429/34, 429/38, 39, 44, 234, 235, 245; 427/115
See application file for complete search history.

(56) References Cited

U.S. PATENT DOCUMENTS

| 3,134,697 A | 5/1964 | Niedrach ........................ 136/86 |
| 3,677,814 A | 7/1972 | Gillery et al. ................. 117/211 |
| 4,146,657 A | 3/1979 | Gordon ......................... 427/126 |
| 4,272,353 A | 6/1981 | Lawrance et al. ............. 204/283 |

(Continued)

FOREIGN PATENT DOCUMENTS

EP   202343   11/1992

(Continued)

OTHER PUBLICATIONS

M. Hilgendorf, L. Spanhebel, Ch. Rothenhäusler and G. Müller "From ZnO Colloids to Nanocrystalline Highly Conductive Films" in J. Electrochem. Soc., vol. 145, No. 10, Oct. 1998, pp. 3632-3637.

(Continued)

*Primary Examiner* — Raymond Alejandro
(74) *Attorney, Agent, or Firm* — Harness, Dickey & Pierce, P.L.C.

(57) ABSTRACT

In one aspect a substrate such as a sheet metal product, in particular for use as a bipolar plate in a fuel cell or in an electrolyzer, is characterized in that it has, on at least one side, a conductive and corrosion-resistant protective coating of a metal oxide having a treatment which ensures the conductivity. The coating can be produced by introducing a piece of sheet metal into a coating plant and providing it with the conductive and corrosion-resistant protective coating of the metal oxide. In another aspect, an electrochemical cell such as a fuel cell comprises an electrically conductive contact element having a first surface facing an electrode for conducting electrical current, and the contact element comprises an electrically conductive substrate and an electrically conductive coating comprising a doped metal oxide, desirably a doped tin oxide, and preferably a fluorine doped tin oxide.

54 Claims, 10 Drawing Sheets

U.S. PATENT DOCUMENTS

| | | | |
|---|---|---|---|
| 4,510,219 A | 4/1985 | Rowlette | |
| 4,708,918 A | 11/1987 | Fitzgerald et al. | 429/217 |
| 4,973,358 A | 11/1990 | Jin et al. | 75/415 |
| 5,272,017 A | 12/1993 | Swathirajan et al. | 429/33 |
| 5,334,464 A | 8/1994 | Rowlette | 429/210 |
| 5,624,769 A * | 4/1997 | Li et al. | 429/32 |
| 5,643,690 A * | 7/1997 | Tateishi et al. | 429/34 |
| 5,800,946 A | 9/1998 | Grosvenor et al. | 429/210 |
| 5,942,347 A | 8/1999 | Koncar et al. | 429/30 |
| 5,963,417 A * | 10/1999 | Anderson et al. | 361/503 |
| 5,981,072 A | 11/1999 | Mercuri et al. | |
| 6,037,074 A | 3/2000 | Mercuri et al. | 429/34 |
| 6,077,623 A | 6/2000 | Grosvenor et al. | 429/210 |
| 6,090,228 A * | 7/2000 | Hwang et al. | 148/518 |
| 6,096,450 A | 8/2000 | Walsh | 429/34 |
| 6,103,413 A | 8/2000 | Hinton et al. | 429/32 |
| 6,146,780 A | 11/2000 | Cisar et al. | 429/34 |
| 6,248,467 B1 | 6/2001 | Wilson et al. | 429/39 |
| RE37,284 E | 7/2001 | Li et al. | 429/32 |
| 7,005,205 B1 * | 2/2006 | Gyoten et al. | 429/34 |
| 2002/0081478 A1 | 6/2002 | Busenbender | 429/34 |

FOREIGN PATENT DOCUMENTS

| | | |
|---|---|---|
| EP | A-0933825 | 8/1999 |
| EP | A-0940868 | 9/1999 |
| EP | A-0975039 | 1/2000 |
| EP | A-0984081 | 4/2003 |
| EP | A-983973 | 5/2003 |
| JP | 08-185870 * | 7/1996 |
| WO | WO 96/11802 | 4/1996 |
| WO | WO98/10477 | 3/1998 |
| WO | WO98/53514 | 11/1998 |

OTHER PUBLICATIONS

R. Gordon, Chemical Vapor Deposition of Coatings on Glass, Journal of Non-Crystalline Solids 218 (1997) 81-91.

Acosta et al., "About the structural, optical and electrical properties of $SnO_2$ films produced by spray pyrolysis from solutions with low and high contents of fluorine," Thin Solid Films 288 (1996) 1-7.

Ma et al., "Electrical and optical properties of F-doped textured $SnO_2$ films deposited by APCVD," Solar Energy Materials and Solar Cells 40 (1996) 371-380.

Sekhar et al., "Preparation and study of doped and undoped tin dioxide films by the open air chemical vapor deposition technique," Thin Solid Films 307 (1997) 221-227.

Mientus et al, "Structural, electrical and optical properties of $SnO_{2-x}$:F-layers deposited by DC-reactive magnetron-sputtering from a metallic target in $Ar-O_2/CF_4$ mixtures," Surface and Coatings Technology 98 (1998) 1267-1271.

Suh, et al., "Atmospheric-pressure chemical vapor distribution of fluorine-doped tin oxide thin films" Thin Solid Films 345 (1999) 240-243.

Perry et al., Chemical Engineers' Handbook Fifth Edition (1973) pp. 68-69.

International Search Report dated Jun. 20, 2003; Int'l Appln. No. PCT/US03/05609.

* cited by examiner

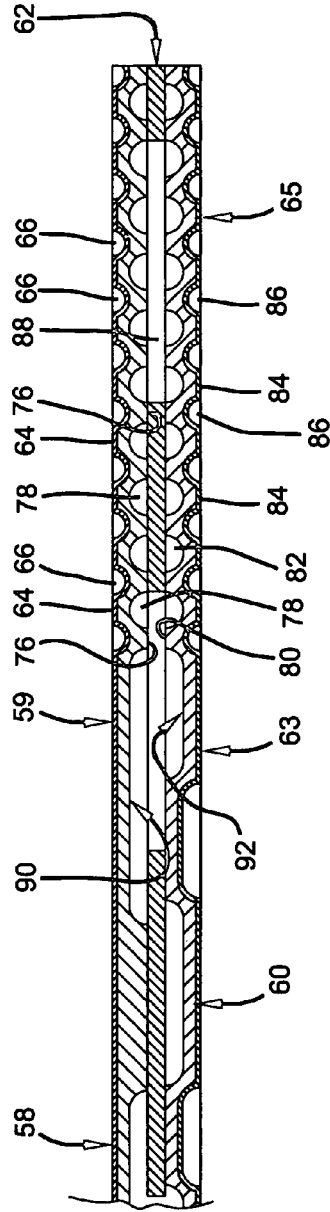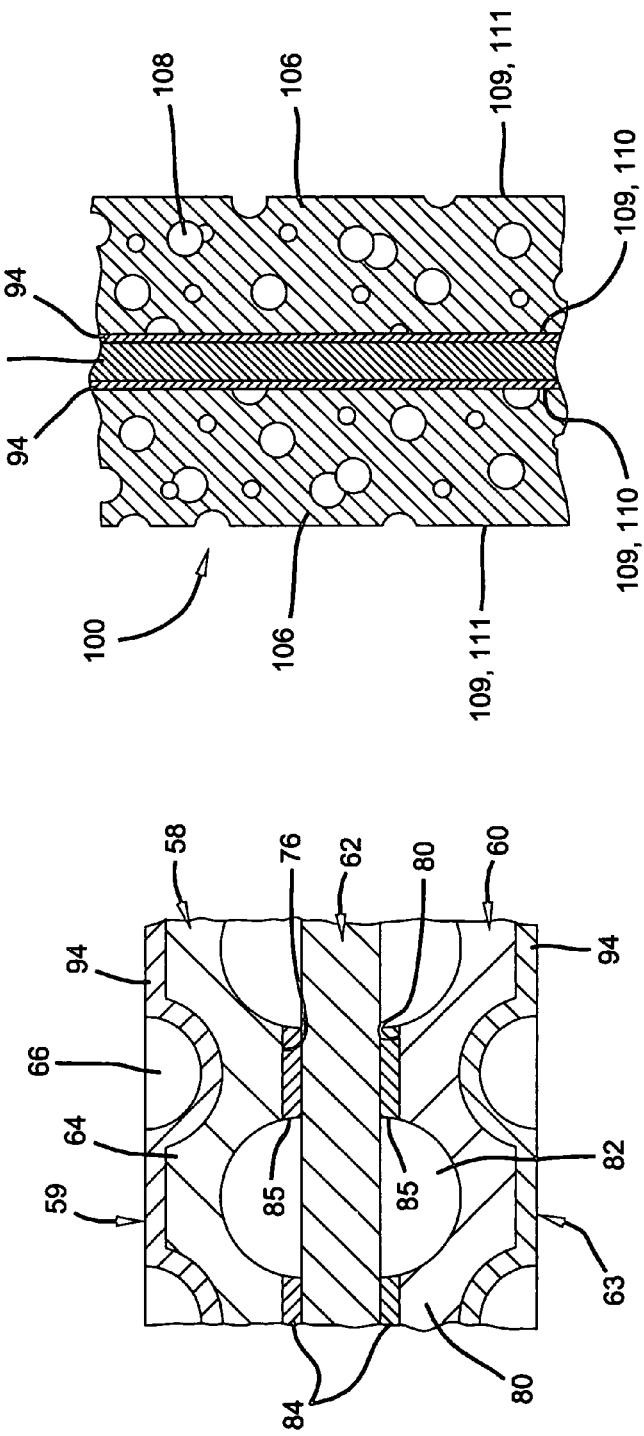

US 7,968,251 B2

ELECTRICAL CONTACT ELEMENT AND BIPOLAR PLATE

CROSS-REFERENCE TO RELATED APPLICATIONS

This application is a continuation of and takes priority from abandoned U.S. Ser. No. 10/087,677 filed Mar. 1, 2002; and also takes priority from and is a continuation of abandoned U.S. Ser. No. 10/004,322 filed Oct. 25, 2001, such application claiming priority to German application Serial Number 10058337.7 filed Nov. 24, 2000; each of the aforesaid applications being incorporated herein by reference in their entirety.

FIELD OF THE INVENTION

The present invention relates to fuel cells, and more particularly to electrical contact elements for such cells. The present invention also relates to a sheet metal product, in particular for use as a bipolar plate in a fuel cell or in an electrolyzer, to a plate of this kind and also to a method of manufacturing a sheet metal product and a bipolar plate.

BACKGROUND OF THE INVENTION

Fuel cells have been proposed as a power source for electric vehicles and other applications. One known fuel cell is the PEM (i.e., Proton Exchange Membrane) fuel cell that includes a so-called "membrane-electrode-assembly" comprising a thin, solid polymer membrane-electrolyte having an anode on one face of the membrane-electrolyte and a cathode on the opposite face of the membrane-electrolyte. The anode and cathode typically comprise finely divided carbon particles, very finely divided catalytic particles supported on the internal and external surfaces of the carbon particles, and proton: conductive material intermingled with the catalytic and carbon particles. One such membrane-electrode assembly and fuel cell is described in U.S. Pat. No. 5,272,017 issued Dec. 21, 1993 and assigned to the assignee of the present invention. The membrane-electrode-assembly is sandwiched between a pair of electrically conductive contact elements which serve as current collectors for the anode and cathode. Flow fields are provided for distributing the fuel cell's gaseous reactants over surfaces of the respective anode and cathode. The electrical contact elements may themselves form a part of the flow field in the form of appropriate channels and openings therein for distributing the fuel cell's gaseous reactants (i.e., $H_2$ & $O_2$) over the surfaces of the respective anode and cathode.

A fuel cell stack comprises a plurality of the membrane-electrode-assemblies stacked together in electrical series. The membrane-electrode-assemblies are separated from one, another by an impermeable, electrically conductive contact element, known as a bipolar plate. The bipolar plate has two major surfaces, one facing the anode of one cell and the other surface facing the cathode on the next adjacent cell in the stack. The plate electrically conducts current between the adjacent cells. Contact elements at the ends of the stack contact only the end cells and are referred to as end plates.

In a PEM fuel cell environment that employs $H_2$ and $O_2$ (optionally air), the bipolar plates and other contact elements (e.g., end plates) are in constant contact with acidic solutions (pH 3 to 5).

In addition, the fuel cell operates at elevated temperature on the order of 60° C. to 100° C. Moreover, the cathode operates in a highly oxidizing environment, being polarized to about +1 V (in comparison to a normal hydrogen electrode, i.e., the anode) while being exposed to pressurized air. The anode is constantly exposed to a harsh environment of pressurized hydrogen. Hence, many of the conventional contact elements are made from metal and must be resistant to acids, oxidation, and hydrogen embrittlement in the fuel cell environment. Metals which meet this criteria are costly. One proposed solution has been to fabricate the contact elements from graphite, which is corrosion-resistant, and electrically conductive, however, graphite is quite fragile and difficult to machine.

Lightweight metals such as aluminum and titanium and their alloys, as well as stainless steel, have also been proposed for use in making fuel cell contact elements. Such metals are more conductive than graphite, and can be formed into very thin plates. Unfortunately, such lightweight metals are susceptible to corrosion in the hostile fuel cell environment, and contact elements made therefrom either dissolve (e.g., in the case of aluminum), or form highly electronically resistive, passivating oxide films on their surface (e.g., in the case of titanium or stainless steel) that increases the internal resistance of the fuel cell and reduces its performance. To address this problem it has been proposed to coat the lightweight metal contact elements with a layer of metal or metal compound which is both electrically conductive and corrosion resistant to thereby protect the underlying metal. See for example, U.S. Pat. No. 5,624,769 by Li et al., which is assigned to the assignee of the present invention, and discloses a light metal core, a stainless steel passivating layer atop the core, and a layer of titanium nitride (TiN) atop the stainless steel layer.

Another type of contact element, a bipolar plate, is molded from a polymer resin and has a conductive carbon or graphite powder embedded therein for electrical conductivity. Such material is typically 80% carbon and 20% polymer on a weight basis. Since these materials cannot be fabricated as thin metal substrates, the volumetric power density of stacks using these plates is usually low and they are not widely used. Examples of such composite plates can be found in U.S. Pat. Nos. 6,096,450, 6,103,413 and 6,248,467. Still another type of plate is graphoil, exfoliated graphite, flake material processed as a graphite plate embossed to a final shape and impregnated with a resin. Such material is typically 99% carbon and 1% resin filler.

Accordingly, so-called bipolar plates are used in all types of fuel cells and form both a closure impermeable to gas and liquids for a respective cell and also, with a stacked arrangement of cells, an electrical connection between adjacent cells, so that the positive side of the one cell is simultaneously the negative side of the adjacent cell, which is the reason for the name "bipolar plate".

As mentioned earlier, problematic in such bipolar plates is the fact that they are subject to corrosion in the environment of the fuel cell, with corrosion producing substances being present in all types of fuel cells.

At the present time, such bipolar plates are provided with a corrosion-resistant layer of a noble metal, such as gold or platinum. Such layers of noble metals are admittedly corrosion-resistant and simultaneously provide the required conductivity. However, they are expensive.

Bipolar plates are also known which are manufactured from graphite and graphite/plastic mixtures, such as are described in EP-A-0933825. These are, however, often brittle materials. If desired to machine these materials and to use them in a fuel cell, the plates must have a certain thickness, which is disadvantageous with respect to the power-to-weight ratio of a fuel cell stack and thus also has an effect on the use of fuel cells in mobile applications, for example, as a source of motive power for a vehicle. The use of plates of graphite and graphite/plastic mixtures is accordingly likewise associated with disadvantages in certain aspects.

SUMMARY OF THE INVENTION

In one aspect of the present invention, there is provided a fuel cell comprising an ion conducting membrane, a catalytic electrode on one face of the membrane, a catalytic electrode on the other face of the membrane, and an electrically conductive contact element having a first surface facing at least one of the electrodes for conducting electrical current from the electrode, where the contact element comprises an electrically conductive substrate and an electrically conductive coating comprising a doped metal oxide, desirably a doped tin oxide, and preferably a fluorine doped tin oxide.

In one variation, the electrically conductive substrate comprises a metal susceptible to corrosion, and the coating is a corrosion-resistant protective coating which protects the substrate from the corrosive environment of the fuel cell.

In another variation, the electrically conductive substrate comprises electrically conductive particles dispersed in a binder matrix, and the electrically conductive coating provides electrical contact between the substrate and the next adjacent layer. Preferably, the coating has a conductivity at least equivalent to or greater than the substrate.

Preferably, the fuel cell further includes a thin layer of porous material, such as carbon paper or carbon cloth, disposed between the electrode and the electrically conductive contact element, and the coating enhances or at least maintains electrical conductivity between the contact element and the porous material.

In another aspect, there is provided an electrically conductive fluid distribution element for an electrochemical cell which comprises an electrically conductive substrate having first and second major surfaces, a flow field at the first surface for distributing fluid along the first surface, and an electrically conductive coating on the first surface which comprises a doped metal oxide, desirably a doped tin oxide, and preferably a fluorine doped tin oxide film.

Preferably, the substrate is selected from the group consisting of titanium, stainless steel, aluminum, and a composite of electrically conductive particles dispersed in a binder matrix.

In one variation, the electrically conductive fluid distribution element has a substrate which is essentially planar and the flow field comprises a layer of electrically conductive foam. Preferably, the foam is an open cell foam, most preferably the foam is conductive graphite foam or conductive metallic foam.

In still another embodiment, the foam is protected by a coating. Here, CVD or other electro-deposition methods are used to coat the three dimensional foam structure. The coated foam is attached to a impervious barrier sheet. The foam may be coated to a desired depth inward from the exposed surface of the foam. Such an electroconductive coating may comprise a doped metal oxide, desirably a doped tin oxide, and preferably a fluorine doped tin oxide. In another alternative, essentially all the internal surfaces of the foam are coated with the coating. In a preferred embodiment, only the outer surface of the foam is coated since such outer surface is exposed to the corrosive elements of the membrane-electrode assembly.

Metal foams such as stainless steel foams which do not chemically decompose are preferably protected at the surface of the foam or to some selected depth. Other metal foams such as aluminum foams which are subject to chemical dissolution are preferably coated throughout, which includes coating from the outer surface of the foam, throughout its thickness, and to the inner surface of the foam facing the planar element.

Preferably, the coating of the present invention comprises a doped tin oxide. The dopant is selected to provide "extra" electrons which contribute to the conductivity. The preferred dopant is fluorine. Exemplary other dopants such as antimony, indium, or chlorine may also be used. However, fluorine is known to provide a relatively low resistivity oxide film. The amount of fluorine dopant in the tin oxide coating is selected to provide the desired conductivity. Any amount of fluorine will enhance conductivity. Generally it has been found that less than 10 weight percent of fluorine is desired.

In another variation, the flow field comprises a series of channels in the first major surface. Preferably, the flow field comprises lands defining a plurality of grooves for distributing fuel or oxidant along the first surface of the substrate. Preferably, the element comprises a second flow field at a second surface, and the second flow field comprises lands defining a plurality of grooves for distributing coolant fluid along the second surface.

The contact element has a working face, or surface, that serves to conduct electrical current from its associated electrode. In one aspect, the contact element comprises a corrosion-susceptible metal substrate, having an electrically conductive, corrosion-resistant, protective coating on the working face to protect the substrate from the corrosive environment of the fuel cell. A "corrosion susceptible metal" is a metal that is either dissolved by, or oxidized/passivated by, the cell's environment. Correspondingly, the reference to corrosion herein encompasses degradation by acid attack, dissolution, oxidation and passivation, as well as other known mechanisms of degradation, and enhanced by the presence of anodic or cathodic dissolution.

An oxidizable metal layer may be dispersed over a dissolvable metal substrate, and underlie the protective coating layer. This is described in U.S. Pat. No. RE 37,284, reissue of U.S. Pat. No. 5,624,769 owned by the assignee of the present invention.

In another aspect, the coating of the present invention serves to facilitate electrical contact between the substrate and the next adjacent layer in a fuel cell. For example, electrical conductivity is enhanced or at least maintained between a substrate, such as a composite, and a porous conductive layer such as a carbon cloth.

The coating preferably has a resistivity on the order of no greater than about 0.001 ohm-cm, and approaching 0.0001 ohm-cm as in a metal. The coating preferably has a thickness between about 1 micron and about 10 microns depending on the composition, resistivity and integrity of the coating. Thinner coatings (i.e., about 0.1 to 1 micron) are useable and selection depends on cost and other considerations.

The coating may be applied in a variety of ways including: CVD PVD, spray pyrolysis, dip coating and spray coating.

In another aspect, there is provided a method for preventing or at least inhibiting degradation of an electrically conductive element in a fuel cell which has proton conductive material with pendant groups which release acid forming species. Such proton conductive material degrades leading to formation of a corrosive environment in the cell. The method comprises placing a layer or barrier between the proton conductive material and the electrically conductive contact element. The layer or barrier comprising, fluorine doped tin oxide inhibits acid attack, corrosion, or degradation of the electrically conductive contact element. The proton conductive material may comprise perfluoronated sulfonic acid polymer, or a mixture of perfluoronated sulfonic acid polymer and polytetrafluoroethylene (Teflon). Teflon is composed of long chains of linked $CF_2$ units.

The protective coating and its associated assembly are also useful for electrolytic cells where voltage is applied to the cell. Here the same problem of electrical element degradation exists. Therefore, the invention is useful for electrochemical cells, generally.

In another aspect, an object of the present invention is to provide a conductive substrate, a sheet metal product or a bipolar plate of the earlier and initially named kind which can be manufactured at favorable cost, but which nevertheless has the required conductivity and resistance to corrosion, and indeed without the product or the plate having a high weight or a significant space requirement or causing high manufacturing costs or material costs. The earlier named conductive substrate may comprise any of the earlier mentioned: a metal substrate particularly one which is susceptible to corrosion; a substrate formed of electrically conductive particles dispersed in a binder matrix; a matrix of compacted graphite flakes impregnated with a filler; a conductive substrate and a layer of conductive open cell foam having a first face facing the substrate and a second face facing an electrode, and particularly wherein the coating is on the second face of the foam layer. Furthermore, the invention is concerned with the object of manufacturing such conductive substrate, sheet metal products and plates.

In order to satisfy this object there is provided, in accordance with one embodiment of the invention, a sheet metal product of the initially named kind which is characterized in that the sheet metal product has a conductive and corrosion-resistant protective coating of a metal oxide on at least one side, with the metal oxide having a treatment which ensures the conductivity.

Furthermore, the present invention relates to a bipolar plate which is formed from a conductive substrate or sheet metal product and which has at least one side a conductive and corrosion-resistant protective coating of a metal oxide having a treatment which ensures the conductivity.

The invention is based on the consideration that very thin layers of metal oxides, which have an excellent resistance to corrosion, but which normally count as electrically insulating, can be made conductive by a suitable treatment, so that they can be used to provide a conductive substrate or sheet metal product or a plate of metal which is, on the one hand, resistant to corrosion but, on the other hand, conductive, so that current can flow from one side of the plate into the plate and can flow from one side of the plate to the other side of the plate.

Thin conductive coatings of a metal oxide with a doping which ensures conductivity are known from the document EP-A-983973. There, this coating is applied to panes of glass in order to so influence the optical characteristics that a reflection of long-wave light takes place in order to achieve a thermally insulating effect, whereby the electrical conductivity is also simultaneously increased. The conductivity which arises is, however, merely a side effect there. There, the coating has no corrosion preventing action, since panes of glass are in any event resistant to corrosion. A product which has both a high conductivity on the one hand and excellent resistance to corrosion on the other hand first arises through the provision of a sheet metal product with a conductive and corrosion-resistant protective coating of metal oxide having a treatment which ensures the conductivity. A main use of such a sheet metal product is, as mentioned above, as a bipolar plate in a fuel cell. However, a series of other possible applications certainly also comes into consideration in which one requires conductive parts of a favorably priced metal with a corresponding corrosion-resistant coating, for example in the construction of transformers and in larger electrical substations.

At this point, reference should be made also to the document "From ZnO Colloids to Nanocrystalline Highly Conductive Films" in J. Electrochem. Soc., Vol. 145, No. 10, October 1998, pages 3632-3637 by M. Hilgendorf, L. Spanhebel, Ch. Rothenhäusler and G. Muller. Here, chemical processes for the manufacture of conductive zinc oxide layers containing aluminum or indium for window electrodes for solar cells or electroluminescent components are described, with the coating not having to achieve any corrosion-preventing action, but likewise also being capable of being used for the purpose of the present invention.

The treatment of the metal oxide required by the invention to ensure conductivity can take various forms. One possibility is to produce a special crystal structure of the metal oxide coating, so that this adopts a conductive form. A further possibility is to apply a conductive coating comprising one of the elements aluminum, chromium, silver, antimony or molybdenum onto the sheet metal beneath the metal oxide coating. These elements form, together with the coating of the metal oxide applied thereon, a type of doping of the metal oxide which places the latter in a conductive state.

Another possibility is to provide the metal oxide coating with a simultaneously or subsequently deposited doping.

Such protective coatings have the advantage that they are carried out in one working step in a treatment chamber, whereby the sheet metal product can be made at a correspondingly favorable cost.

The protective coating can consist solely of one layer, that is to say it is not essential to deposit a plurality of different layers on the sheet metal part. In this way the coating process is simplified and the manufacturing costs are reduced.

The protective coating preferably consists of an oxide of tin, zinc or indium, or of an oxide of an alloy of these elements. It has been shown that such metal oxides have, on the one hand, an excellent resistance to corrosion and on the other hand, can be made conductive through the use of dopants.

The protective coating preferably consists of a first layer of a metal oxide, of a second layer of a dopant, which ensures the conductivity, and of a third layer of metal oxide. It has been found that a three-layer coating of this kind leads to excellent resistance to corrosion and conductivity. If three layers are provided, then these can be deposited, for example by a PVD method, in a vacuum chamber, so that the manufacturing costs can be kept low. A further possibility of forming the protective coating lies in forming these from an alternating layer sequence of metal oxides and dopants which ensure the conductivity. For this purpose, PVD coating plants which are known per se can be used in which the articles to be coated, here sheet metal parts, are exposed on a rotating plate one after the other to the vapor flux of various coating sources, whereby an alternating layer sequence of this kind can be economically produced. A further possibility lies in producing the protective coating from at least two layers which consist of different metal oxides and are respectively doped, with the doping, for example, being carried out as so-called "volume doping". In other words, the protective coating of the invention is not restricted to a protective coating of only one type of metal oxide.

The dopant, which ensures the conductivity, can for example consist of at least one element of the group aluminum, chromium, silver, boron, fluorine, antimony, chlorine, bromine, phosphorus, molybdenum and/or carbon.

The coating itself is preferably a coating deposited in a vacuum chamber, i.e. a coating which is deposited by a PVD process. A process of this kind makes it possible to deposit very thin layers uniformly at a favorable cost. For example, a protective coating of this kind can be deposited with a thickness in the range between 1 monolayer and one μm (micrometer) preferably between 5 and 100 nm on a sheet metal part. Moreover, the use of such PVD processes brings the advantage that the sheet metal part can be cleaned at the start of the coating process by ion bombardment or plasma etching and that a good anchoring arises between the protective coating and the sheet metal part. It has surprisingly been found that very thin protective coatings are already sufficient in order to ensure the resistance to corrosion of the sheet metal product. When using a sheet metal product as a bipolar plate of a fuel cell, the plate is not actually exposed to any pronounced mechanical loading so that a very thin coating is already sufficient in order to ensure the required corrosion resistance and conductivity over a longer period of time, since a mechanical injury of the coating need not be feared. With very thin coatings, for example under 100 nm thickness, the metal atoms lying beneath it can also lead to a type of doping which ensures the conductivity of the coating; i.e. the application of a very thin layer onto a sheet metal part itself represents the treatment which leads to the conductivity of the metal oxide coating.

The sheet metal which is used for the formation of the sheet metal product or the bipolar plate preferably comprises one of the following materials: aluminum, chrome-plated aluminum, copper, stainless steel, chrome-plated stainless steel, titanium, titanium alloys and iron containing, compounds both with and without metallic coating.

The sheet metal product itself can straightforwardly have a thickness in the range from about 0.001 mm to about 5 mm. It is thus sufficient to produce very thin sheet metal products or bipolar plates which, on the one hand, have the required impermeability for gases and fluids but, on the other hand, exhibit the required resistance to corrosion and conductivity, with such sheet metal product thicknesses additionally permitting the structuring of the sheet metal product. Further preferred embodiments of the invention can be found in the further patent claims and also in the subsequent description.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The invention will be explained in more detail in the following with reference to embodiments and to the drawings. Accordingly, the invention will better be understood when considered in the light of the following detailed description and the several figures in which:

FIG. 3 is a sectioned view in the direction 3-3 of FIG. 2; and

FIG. 4 is a magnified portion of the bipolar plate of FIG. 3;

FIG. 5 is a partial cross-section of a bipolar plate. This design features a thin substrate made from a solid metal sheet with foamed metal flow fields attached to both sides of it. The substrate sheet is coated.

DETAILED DESCRIPTION OF THE PREFERRED EMBODIMENTS

The following description of the preferred embodiment(s) is merely exemplary in nature and is in no way intended to limit the invention, its application, or uses.

Figure 1:
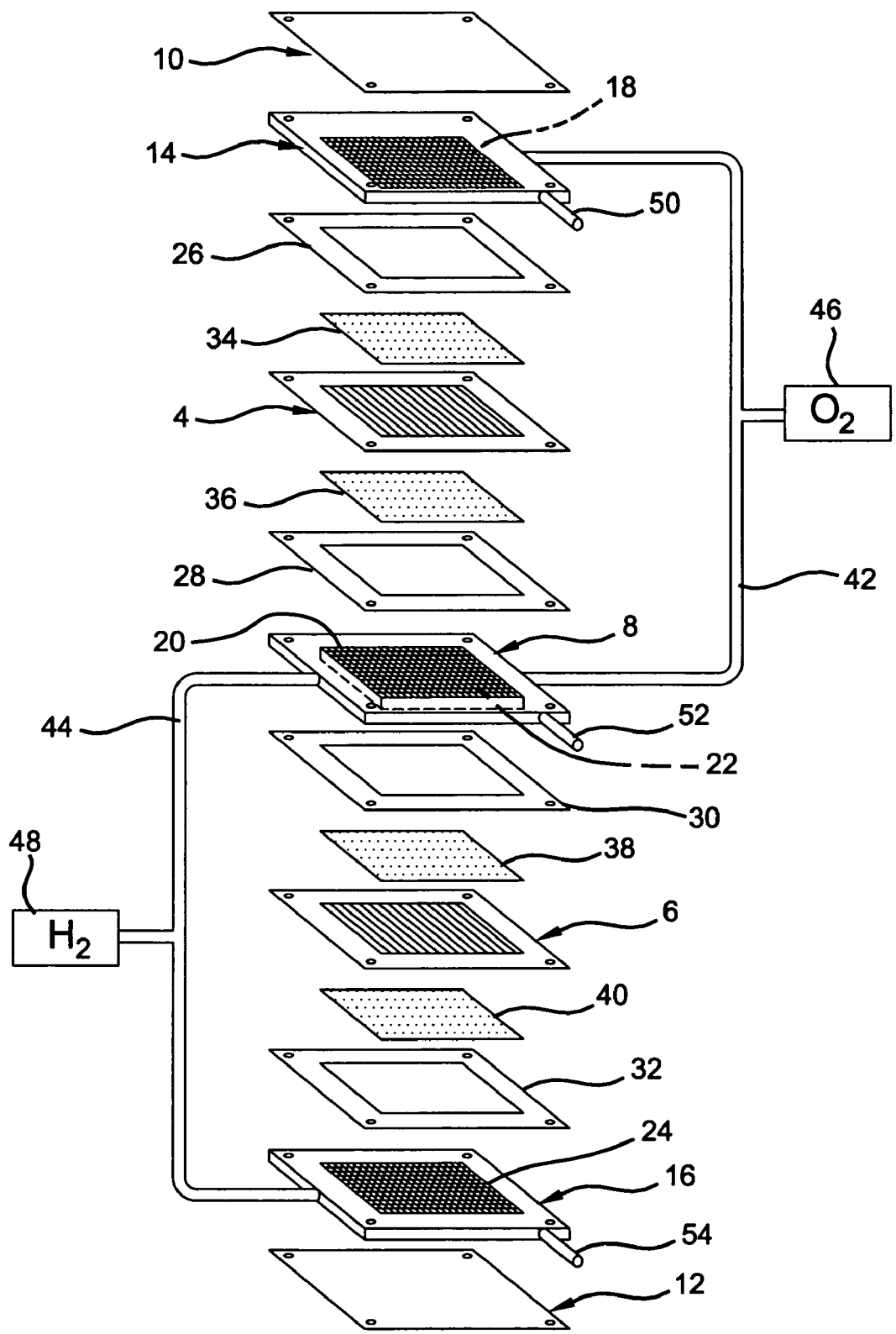
FIG. 1 is a schematic, exploded, isometric, illustration of a liquid-cooled PEM fuel cell stack (only two cells shown)

FIG. 1 depicts a two cell, bipolar fuel cell stack having a pair of membrane-electrode-assemblies (MEAs) 4 and 6 separated from each other by an electrically conductive, liquid-cooled, bipolar plate 8. The MEAs 4 and 6, and bipolar plate 8, are stacked together between stainless steel clamping plates, or end plates, 10 and 12, and end contact elements 14 and, 16. The end contact elements 14 and 16, as well as both working faces of the bipolar plate 8, contain a plurality of grooves or channels 18, 20, 22 and 24, respectively, for distributing fuel and oxidant gases (i.e., $H_2$, and $O_2$) to the MEAs 4 and 6. Nonconductive gaskets 26, 28, 30, and 32 provide seals and electrical insulation between the several components of the fuel cell stack. Gas permeable conductive materials are typically carbon/graphite diffusion papers 34, 36, 38, and 40 press up against the electrode faces of the MEAs 4 and 6. The end contact elements 14 and 16 press up against the carbon/graphite papers 34 and 40 respectively, while the bipolar plate 8 presses up against the carbon/graphite paper 36 on the anode face of MEA 4, and against carbon/graphite paper 38 on the cathode face of MEA 6. Oxygen is supplied to the cathode side of the fuel cell stack from storage tank 46 via appropriate supply plumbing 42, while hydrogen is supplied to the anode side of the fuel cell from storage tank 48, via appropriate supply plumbing 44. Alternatively, ambient air may be supplied to the cathode side as an oxygen source and hydrogen to the anode from a methanol or gasoline reformer, or the like. Exhaust plumbing (not shown) for both the $H_2$ and $O_2$ sides of the MEAs will also be provided. Additional plumbing 50, 52 and 54 is provided for supplying liquid coolant to the bipolar plate 8 and end plates 14 and 16. Appropriate plumbing for exhausting coolant from the plate 8 and end plates 14 and 16 is also provided, but not shown.

As mentioned earlier, the membrane-electrode-assembly (MEA) comprises a proton conductive membrane having electrodes on its opposite faces. The proton conductive membrane may be solid polymer electrolytes (SPE), such as the SPE membranes described in U.S. Pat. Nos. 4,272,353 and 3,134,697. The electrodes also comprise proton conductive material. The bipolar plates adjacent the MEAs are susceptible to decomposition by acid attack, fluoride ions and/or anodic or cathodic dissolution. Acidity and fluorides are thought to be the main decomposition products present within the cell environment. In particular they are generated from the degradation of the SPE membranes. The SPE membranes or sheets are ion exchange resin membranes. The resins include at least two ionic groups, one being fixed within the resins and the other being mobile. In particular, the mobile ion may be replaceable under certain conditions.

The ion exchange resins can be prepared by polymerizing a mixture of ingredients, one of which contains an ionic constituent. One broad class of cation exchange used in proton conductive resins is the so-called sulfonic acid cation exchange resin. In the sulfonic acid membranes, the cation exchange groups are hydrated sulfonic acid radicals that are attached to the polymer backbone by sulfonation.

The formation of the ionic exchange resins is well known in the art and may include the entire membrane having the ion exchange characteristics. One commercially available membrane is the proton conductive membrane sold by E. I. DuPont De Nemours & Co. under the trade, name NAFION. Such proton conductive membranes may be characterized by monomers of the structures: $CF_2=CFOCF_2CF_2SO_3H$ and $CF_2=CFOCF_2C(CF_3)FOCF_2SO_3H$. The characteristics of such ion exchange resins result in the presence of chemical compounds within the cell that attack less electronegative compounds, such as metals.

Figure 2:
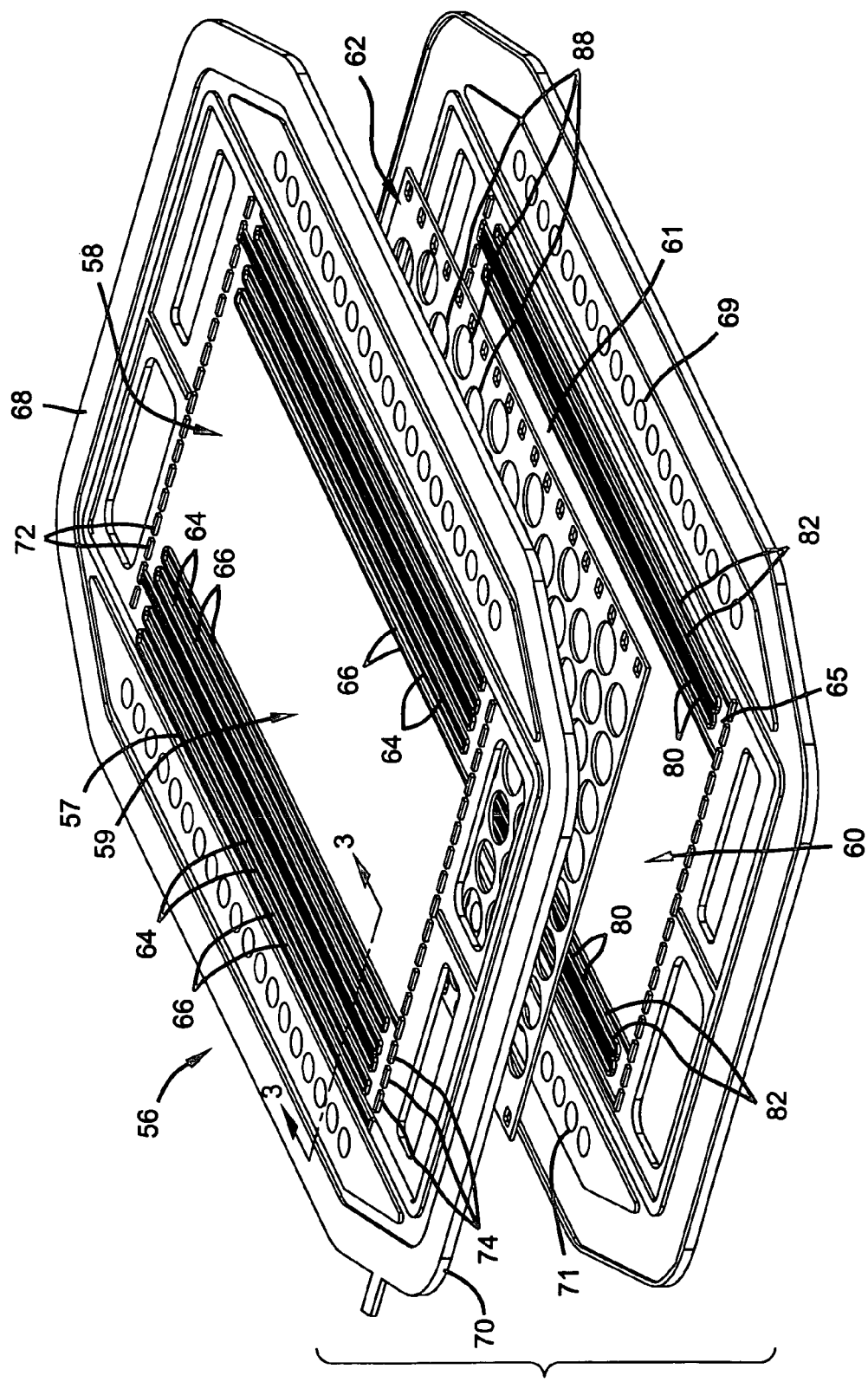
FIG. 2 is an exploded, isometric view of an exemplary bipolar plate with flow field channels useful with PEM fuel cell stacks like that illustrated in FIG. 1.

FIG. 2 is an isometric, exploded view of an exemplary bipolar plate 56, which would form bipolar plate 8 in FIG. 1, comprising a first exterior metal sheet 58, a second exterior metal sheet 60, and an interior spacer metal sheet 62 interjacent the first metal sheet 58 and the second metal sheet 60. The exterior metal sheets 58 and 60 are made as thin as possible (e.g., about 0.002-0.02 inches thick) and may be formed by stamping, by photo etching (i.e., through a photo-lithographic mask), or any other conventional process for shaping sheet metal. The external sheet 58 has a first working face 59 on the outside thereof which confronts a membrane-electrode-assembly (not shown) and is formed so as to provide flow field 57. The flow field 57 is defined by a plurality of lands 64 which define therebetween a plurality of grooves 66 which constitutes the "flow field" through which the fuel cell's reactant gases (i.e., $H_2$ or $O_2$) flow in a tortuous path from one side 68 of the bipolar plate to the other side 70 thereof. When the fuel cell is fully assembled, the lands 64 press against the porous material, carbon/graphite papers 36 or 38 (see FIG. 1) which, in turn, press against the MEAs 4 and 6 respectively. For drafting simplicity, FIG. 2 depicts only two arrays of lands and grooves. In reality, the lands and grooves will cover the entire external faces of the metal sheets 58 and 60 that engage the carbon/graphite papers 36 and 38. The reactant gas is supplied to grooves 66 from a header or manifold groove 72 that lies along one side 68 of the fuel cell, and exits the grooves 66 via another header/manifold groove 74 that lies adjacent the opposite side 70 of the fuel cell. As best shown in FIG. 3, the underside of the sheet 58 includes a plurality of ridges 76 which define therebetween a plurality of channels 78 through which coolant passes during the operation of the fuel cell. As shown in FIG. 3, a coolant channel 78 underlies each land 64 while a reactant gas groove 66 underlies each ridge 76. Alternatively, the sheet 58 could be flat and the flow field formed in a separate sheet of material.

Metal sheet 60 is similar to sheet 58. The internal face 61 (i.e., coolant side) of sheet 60 is shown in FIG. 2. In this regard, there is depicted a plurality of ridges 80 defining therebetween a plurality of channels 82 through which coolant flows from one side 69 of the bipolar plate to the other 71. Like sheet 58 and as best shown in FIG. 3, the external side of the sheet 60 has a working face 63. Sheet 60 is formed so as to provide flow field 65. The flow field 65 is defined by a plurality of lands 84 thereon defining a plurality of grooves 86 which constitute the flow field 65 through which the reactant gases pass. An interior metal spacer sheet 62 is positioned interjacent the exterior sheets 58 and 60 and includes a plurality of apertures 88 therein to permit coolant to flow between the channels 82 in sheet 60 and the channels 78 in the sheet 58 thereby breaking laminar boundary layers and affording turbulence which enhances heat exchange with the inside faces 90 and 92 of the exterior sheets 58 and 60 respectively. Thus, channels 78 and 82 form respective coolant flow fields at the interior volume defined by sheets 58 and 60.

FIG. 4 is a magnified view of a portion of FIG. 3 and shows the ridges 76 on the first sheet 58, and the ridges 80 on the second sheet 60 bonded by binder 85 to the spacer sheet 62.

Figure 6:
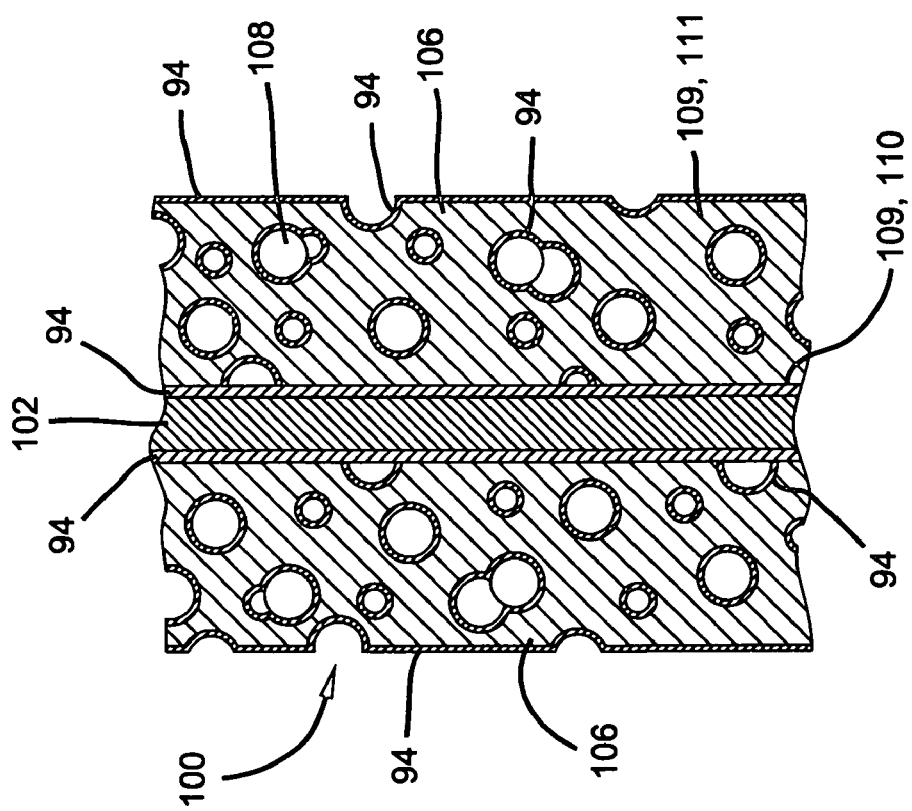
FIG. 6 is a partial cross-section of a bipolar plate. This design features a thin substrate made from a solid metal-sheet with foamed metal flow fields attached to both sides of it. The interior and exterior surfaces of the foam including each face of the foam are coated throughout.

In accordance with the present invention, and as best shown in FIG. 4, the working faces 59 and 63 of the bipolar plate are covered with an electrically conductive, oxidation resistant, and acid-resistant coating 94 comprising a doped metal oxide. A preferred coating 94 is tin oxide. The dopant is selected to provide "extra" electrons which contribute to the conductivity. The preferred dopant is fluorine. Other dopants such as antimony, indium, or chlorine are also useable. However, fluorine is known to provide relatively low resistivity oxide film. The amount of fluorine dopant in the tin oxide coating is selected to provide the desired conductivity. Any amount of fluorine will enhance conductivity. A typical curve of fluorine to oxygen ratio in a film versus electrical conductivity is shown in FIG. 6 of U.S. Pat. No. 4,146,657, by Roy Gordon and commonly assigned ('657 Gordon). Generally it has been found that less than 10 weight percent of fluorine is desired.

In one embodiment, the substrate forming the contact element comprises a corrosion-susceptible metal such as (1) aluminum which is dissolvable by the acids formed in the cell, or (2) titanium or stainless steel which are oxidized/passivated by the formation of oxide layers on their surfaces. In accordance with one embodiment of the invention, the coating is applied directly to the substrate metal.

In another aspect, optionally, one or more layers are disposed between the coating and the substrate, or the substrate itself has multiple layers. For example, the substrate metal comprises an acid soluble metal (e.g., Al) that is covered with an oxidizable metal (e.g., stainless steel) before the electrically conductive protective topcoat is applied. See for example U.S. Pat. No. RE37,284. In another variation, TiO (titanium oxide) is applied to the substrate as a layer before the fluorine doped tin oxide coating is applied.

In another embodiment, the substrate forming the contact element comprises an electrically conductive composite material. Preferably the electrically conductive composite material is a polymer having conductive powder embedded therein to form an electrically conductive contact material. The conductive particles are typically graphite carbon or metal. Examples can be found in the art, for example see U.S. Pat. Nos. 6,096,450, 6,103,413, and 6,248,467. The conductive coating of the present invention is applied to enhance electrical contact between the composite element and the next adjacent fuel cell element.

Figure 7:
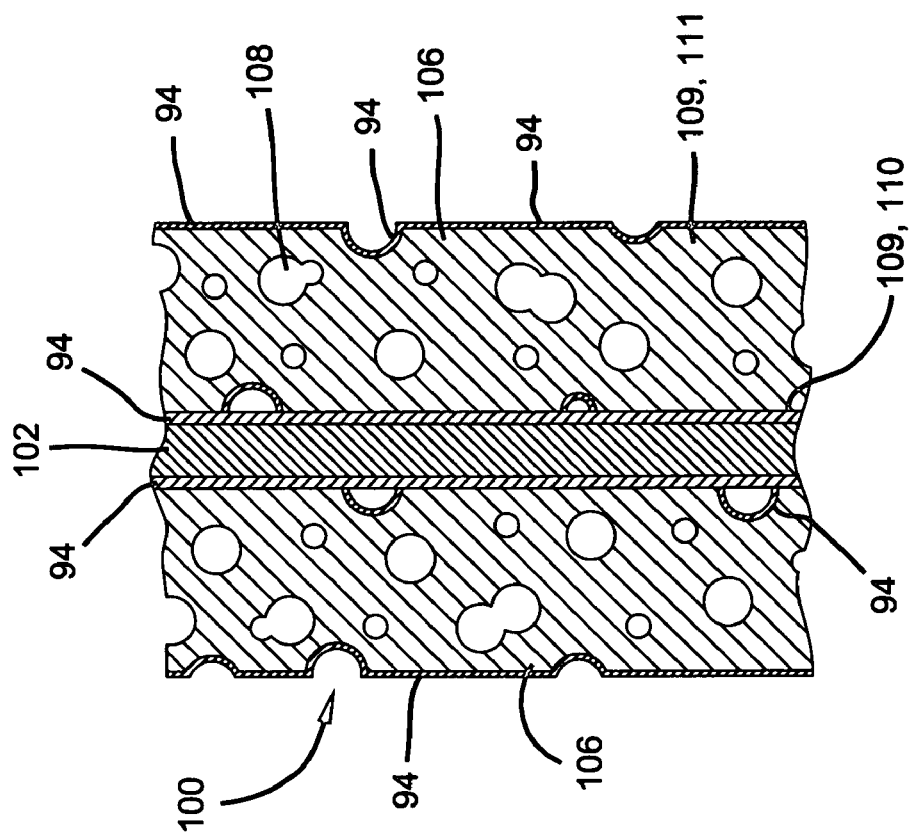
FIG. 7 is a partial cross-section of a bipolar plate. This design features a thin substrate made from a solid metal sheet with foamed metal flow fields attached to both sides of it. The exterior surfaces of the foam are coated to a desired depth.

In still another embodiment, a cross-sectional view of an electrically conductive element 100 is shown in FIG. 5. The element 110 functions as a bipolar plate, constructed with a thin, substrate sheet 102 having foam flow fields 106 attached to both sides. Preferably, sheet 102 is made from a solid titanium metal sheet. Foam flow fields 106, about one-half to about 3 millimeters thick, can be attached as by welding or brazing. The sheet 102 forms the gas barrier and the foam 106 forms the fluid flow fields. As can be seen, foam 106 has opposed major surfaces 110 and 111. Foam 106 has one major surface 110 facing the metal sheet 102 and another major surface 111 opposite 110. Typically, major surface 111 faces the MEA. As shown in FIGS. 5, 6 and 7, major surface 111 forms the outer surface of electrically conductive element 100. Foams can be prepared as metal foams or carbon-based (graphite) foams. Metals that can be prepared as a solid foam in accordance with the present invention include copper, aluminum, nickel, titanium, silver, and stainless steel, with the preferred metals being nickel and stainless steel. Here, the doped tin oxide film 94 is applied to sheet 102 as show in FIG. 5. A variety of foamed metals are available from AstroMet, located in Cincinnati, Ohio. Methods for producing these metal foams are described in U.S. Pat. No. 4,973,358. Carbon-based foams are available from Ultra Met.

In other embodiments, the coating of the substrate and foam vary depending on the characteristics of each of them. Depending on the material of construction and the arrangement of the substrate and foam it may be desirable to coat all of the surfaces of the substrate when a metal sheet is used. In the case of metal foams there is the option to coat all of the internal and external surfaces of the foam, or the option to coat just some of the surfaces. It should be understood that the foam being described herein is an open cell foam. This indicates that there are continuous flow paths or channels throughout the foam created by contiguous openings, or pores, which are open to one another through the thickness of the foam. External surfaces 109 of the foam refer to the aforesaid major surfaces such as 109 which include openings formed by surface pores. Internal surfaces of the foam are surfaces formed by the internal openings or pores 108 as shown in FIG. 5. Since these openings are disposed internally within the foam, the surfaces of the openings are referred to as internal surfaces.

In one embodiment, it is possible to coat all of the internal opening 108, all the external surfaces 109 of the foam facing the MEA and facing the substrate planar sheet 102. (FIG. 6) If a chemically unstable foam such as aluminum foam is used, this would be desired. Optionally, the surfaces of sheet 102 are also coated. If a more chemically stable foam such as stainless steel is used, the coating of internal and external surfaces of the foam may not be necessary depending on the environment of the cell. In this case, the foam interior may remain uncoated or be coated to a given depth. Preferably, the coating is applied to the parts of the foam which are required to transfer electrons from one medium to the next, for example, from the foam surface 111 to the MEA or from the foam surface 110 to the planar sheet 102. As can be seen, in this embodiment, the coating 94 is applied to the electrically conductive element where electrons flow into and out from the structure of the electrically conductive element 100. (FIG. 7) Once electrons are flowing through the structure of the element 100, i.e., the foam, there is no resistance within the foam and the next encountered region of resistance is met where the electrons exit the foam toward or at the surface of the metal sheet 102. In this embodiment, coating 94 is applied to the major surface 111 of the foam 106 to a micron depth level. In addition in this embodiment it is desirable to also coat the foam to a micron depth level at major surface 110 where it faces the planar sheet metal 102.

In yet another embodiment where the foam 106 is essentially metallurgically attached to the sheet metal plate 102 such as by braising or welding, the problem of contact resistance is obviated or is slight and it is not necessary to coat the surface region 110 of the foam 106 which is metallurgically attached or bonded to the sheet metal plate 102. This embodiment is not shown but is easily understood referring to FIG. 7. This embodiment is similar to that shown in FIG. 7, except that coating 94 is not present on surface 110 of the foam 106 facing and attached to substrate 102.

It will be evident that the application of coating to any combination of surfaces of foam and planar sheet is contemplated and further that coating of the foam to any desired extent throughout its thickness is also contemplated.

The coating 94 may be applied in a variety of ways. Chemical Vapor Deposition (CVD) or Physical Vapor Deposition (PVD) deposited coatings are particularly advantageous because they can be quickly deposited in an automated process with little waste, and can be deposited substantially uniformly onto substrates. CVD is preferred for substrates having complex recessed surfaces like those used to form the reactant flow fields on the working face(s) of the contact elements. CVD and PVD are well-known processes useful to coat a variety of conductive substrates such as automobile and truck bodies. CVD technology is discussed in a variety of publications including "WO 96/11802 owned by Libbey Owens. A preferred deposition process is described in '657 Gordon. According to Gordon, a particular feature of the deposition is to select the reactants in such a way that the required tin-fluorine bond is not formed until the deposition is imminent. Thus, the tin fluoride material is maintained in the vapor phase and at temperatures low enough that oxidation of the compound occurs only after the rearrangement to form a tin-fluorine bond. Films of fluorine-doped tin oxide, thus formed, have very low electrical resistivity. In the process described in '657 Gordon, controlled amounts of fluorine impurity are introduced into the growing tin oxide film. The fluorine dopant is a vapor containing one tin-fluorine bond in each molecule. The other three tin valences are satisfied by organic groups and/or halogens other than fluorine. Typical of such compounds is tributyltin fluoride. In the '657 Gordon process the bound fluorine, can be made available to a hot surface in vapor form, and is not cleaved from the tin during oxidation at a hot surface. More specifically, the '657 Gordon deposition process forms the fluorine dopant from volatile compounds which do not have the required tin-fluorine bond, but which will rearrange on heating to form a direct tin-fluorine bond. This rearrangement advantageously occurs at temperatures high enough (e.g., >100° C.) so that the tin fluoride thus formed remains in the vapor phase, but also low enough (e.g., <500° C.) so that the oxidation of the compound occurs only after the rearrangement. Examples of such compounds are trimethyl trifluoromethyltin and dibutyltin diacetate. See '657, Gordon, columns 4 and 5.

EXAMPLE

In the preparation of coating samples, fluorine (F) doped tin oxide films are deposited on various substrates by chemical vapor deposition by a process according to '657 Gordon. Substrates include 1"×1" coupons of gold and SS 316 as well as 2"×2" coupons of Al and Ti. Substrates preferably are polished and cleaned before loading them into the CVD furnace. Commercially available dibutyl tin diacetate ('657 Gordon) is used as the tin precursor and the deposition temperature is up to 500° C. An estimated 0.5 to 1% F-dopant level is achieved with a target value of final thickness of the sample at 1.0 micrometers. Typical parameters for the preparation of fluorine doped tin oxide can be found in several publications (R. Gordon, Journal of Non-Crystalline Solids 218 (1997) 81-91, and 4,146,657 Gordon).

The contact resistance of coatings, made by a process as described above according to '657 Gordon, was measured. This was done by compressing the sample in between two carbon paper diffusion papers (Toray) at 200 psig and applying 1 A/cm$^2$ current. F-doped $SnO_2$ films were on one side of the substrate. The coatings as tested were estimated to have F-content of above 0.6 weight percent. The contact resistance was obtained from the voltage drop between the diffusion media (paper) and the metal coupon across the coating. The contact resistances did not change significantly before and after corrosion experiments, indicating good protection of the underlying Ti and SS substrates. The contact resistance, as coated on Ti was about 10 to 12 milliohms×cm$^2$. This indicates that the bulk conductivity of the coating should compare favorably to those reported in the literature, on the order of 1,000 Siemens per cm. The contact resistance was on the same order of magnitude as comparative Pt coated Ti and comparative conductive polymeric coating on Ti.

Low corrosion currents were observed while cycling the potential between +0.4 and +0.6 V (vs. Ag/AgCl) in aerated solution and between −0.5 and −0.4 V (vs. Ag/AgCl) in $H_2$-saturated solution at 80° C., simulating the bipolar plate environment for the cathode and the anode, respectively (pH=3.0, 10 ppm HF, and 0.5 molar $Na_2SO_4$ supporting electrolyte). Potentiostatic corrosion experiments were also conducted over 6 hours at both +0.6 V (Ag/AgCl, in air) and at −0.4 V (Ag/AgCl, in hydrogen) and the measured corrosion currents under these conditions were of the same order of magnitude, indicating good stability of the coating.

SEM micrographs were taken on samples before corrosion testing and on coatings which had been exposed to extended polarization at either +0.6 V (Ag/AgCl), in air) and at −0.4 V (Ag/AgCl, in hydrogen). SEM micrographs revealed a very dense layer with no observable defects, so that the coatings appeared nearly pore free. No changes in the coating were observed after the corrosion tests indicating good corrosion stability.

In summary, fluorine-doped $SnO_2$ was tested on titanium (Ti) and stainless steel (SS) under simulated fuel cell environment for its corrosion stability and also for its conductivity before and after corrosion. The results clearly showed no degradation.

As can be seen from the above description, due to the cell's hostile environment, coatings are useful on oxidizable metals (e.g., titanium or stainless steel) and on metals that are susceptible to dissolution in the fuel cell environment (e.g., aluminum). In the case of oxidizable metals, the oxide film formed in the fuel cell environment reduces contact and increases electrical resistance. This occurs due to the oxidizable/passivating nature of the metal (e.g., titanium or stainless steel) when exposed to the high temperature of 60° C. to 100° C., the potentials, and acidic (i.e., HF) environment in the cell. Chemical corrosion of aluminum in this environment may lead to total dissolution. Thus, the coating of the invention makes it possible to use these metals, (i.e., SS, Ti and Al) in the fuel cell. The coating itself may consist of one or more layers. If there are voids in the layers of the coating, the coating is still very effective if the voids are small, dispersed, or not aligned. Thus, throughways or passages through the coating are minimized by multiple layers.

It is possible to also coat the sides of the electrical contact element facing the coolant flow channel. However, this is not strictly necessary since coolants are typically not corrosive. The manufacturing process may conveniently be one where coating of both faces is desired. The coating of the coolant face, though not necessary in current applications, is certainly possible and should be considered optional.

As stated earlier, the coating is preferably deposited onto the substrate using conventional PVD techniques (e.g., sputtering), or CVD techniques known to those skilled in the art. In addition, conductive coatings of different types are deposited by a variety of means. Various metal oxides, such as stannic oxide $SnO_2$, indium oxide $In_2O_3$, and cadmium stannate $Cd_2SnO_4$, have been the most widely used materials for forming transparent, electrically conductive coatings and layers. The intentional addition of certain impurities is important in these processes, in order to achieve high electrical conductivity and high infrared reflectivity. Thus, tin impurity is incorporated in indium oxide, while antimony is often added to tin oxide (stannic oxide) for these purposes. In each case the function of these desirable impurities ("dopants") is to supply "extra" electrons which contribute to the conductivity. The solubility of these impurities is high, and they can be added readily using a variety of known deposition methods.

It is noted that a relatively low resistivity tin oxide film was reported in U.S. Pat. No. 3,677,814 to Gillery. Using a spray method, he obtained fluorine-doped tin oxide films with resistance as low as 15 ohms per square centimeter by utilizing a compound, as a starting material, which has direct tin-fluorine bonds. Newer deposition methods as disclosed in '657 Gordon, provide fluorine-doped tin oxide coatings of as low as $10^{-4}$ ohms-centimeter. This is equivalent to the low resistivity of much more expensive materials like tin doped indium oxide, which is not corrosion resistant, and is comparable to the films described in the Example above.

Methods of deposition and electrical and other properties of F-doped tin oxide film ($SnO_2$:F) can be found in a variety of references including: (1) Acosta et al., "About the structural, optical and electrical properties of $SnO_2$ films produced by spray pyrolysis from solutions with low and high contents of fluorine," Thin Solid Films 288 (1996) 1-7; (2) Ma et al., "Electrical and optical properties of F-doped textured $SnO_2$ films deposited by APCVD," Solar Energy Materials and Solar Cells 40 (1996) 371-380; (3) Sekhar et al., "Preparation and study of doped and undoped tin dioxide films by the open air chemical vapor deposition technique," Thin Solid Films 307 (1997) 221-227; (4) Mientus et al., "Structural, electrical and optical properties of $SnO_{2-x}$:F-layers deposited by DC-reactive magnetron-sputtering from a metallic target in Ar—$O_2$/$CF_4$ mixtures," Surface and Coatings Technology 98 (1998) 1267-1271 and (5) Suh, et al., "Atmospheric-pressure chemical vapor distribution of fluorine-doped tin oxide thin films" Thin Solid Films 345 (1999) 240-243.

The advantage of CVD prepared F-doped $SnO_2$ is that thick order of 10 micrometers (microns) and nearly pinhole free coatings can be prepared in a cost-effective manner. This provides corrosion protection for metals subject to dissolution oxidation and passivation in a fuel cell environment, including aluminum bipolar plates. In contrast to carbon/polymer composite coatings, F-doped $SnO_2$ is characterized by very low porosity and a low density of pinholes.

Figure 8:
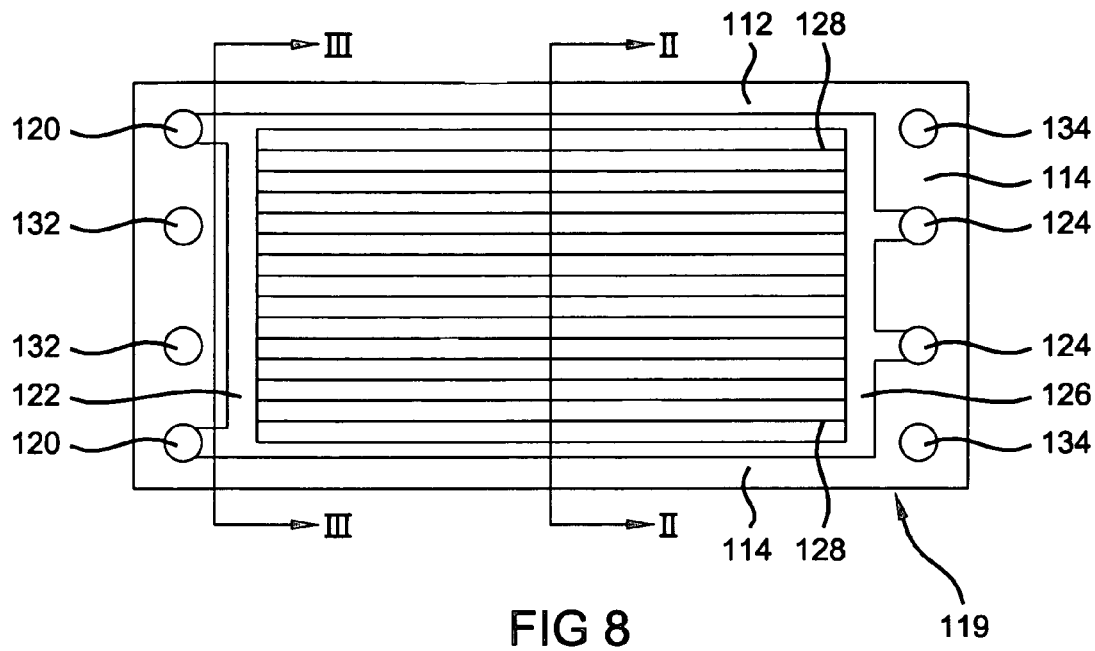
FIG. 8 is a schematic plan view of a bipolar plate of a fuel cell with a protective coating in accordance with the invention.
Figure 9:
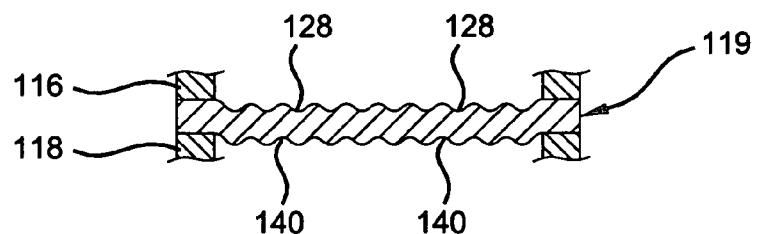
FIG. 9 is a cross-section through the bipolar plate of FIG. 8 in accordance with the section plane III-III.
Figure 10:
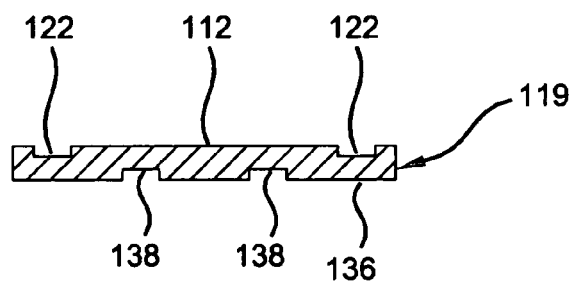
FIG. 10 is a cross-section-through the bipolar plate of FIG. 8 corresponding to the section plate III-III.
Figure 11:
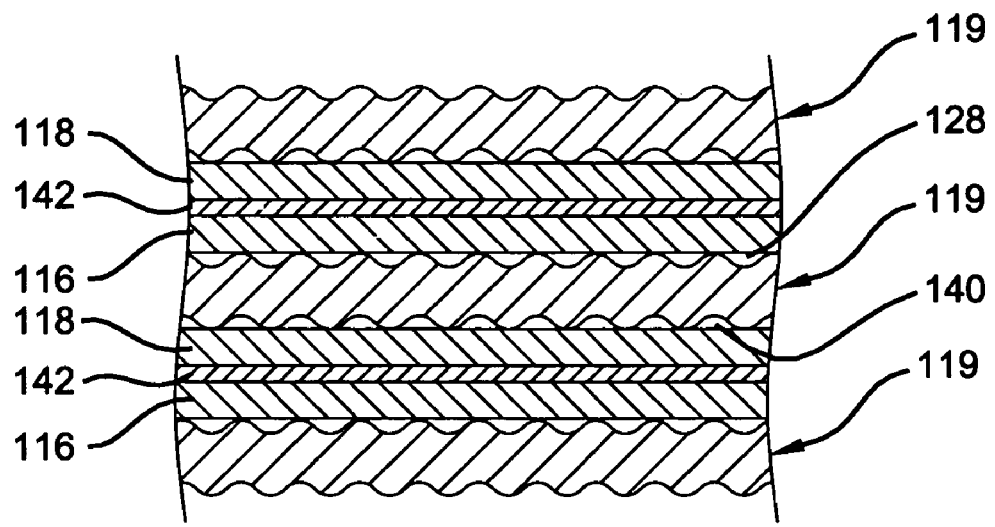
FIG. 11 is a schematic cross-section of a section of two adjacent fuel cells in order to explain the use/function of the bipolar plates.

FIGS. 8 through 10 show another representation of a bipolar plate 119 which is suitable for use in a fuel cell arrangement consisting of a plurality of stacked PEM fuel cells (as indicated in FIG. 11). Such bipolar plates are well known per se; they are, for example, described in the following documents: EP-A-97202343.6, EP-A-0975039, WO98/53514, EP-A-0940868, WO98/10477 and EP-A-0984081.

The present FIGS. 8 through 11 are simply schematic drawings in order to explain the shaping of such bipolar plates.

The upper side of the bipolar plate 119 of FIG. 8 is provided with a peripheral margin 114 which lies in a plane and which makes it possible to integrate the plate in a stack of plates and to ensure a sealed connection to upper and lower plates 116 and 118, which are only schematically shown in the FIGS. 9 and 10. At the one side of the plate two supply openings 120 for, for example, air are provided which communicate with a recessed channel region 122. At the other side of the bipolar plate there are two further discharge openings 124 for used air which communicate with a recessed channel region 126. Between the recessed channel region 122 and the recessed channel region 126 there are flow passages which extend in the longitudinal direction of the bipolar plate and which make it possible for air supplied via the supply openings 120 to flow from the left-hand side of the plate to the right-hand side of the plate to the discharge openings 124. During this, this air reaches catalytically-coated surfaces of the plate 116 belonging to the membrane electrode assembly (MEA) disposed above the channels 126 and reacts there with protons in order to form water, whereby an electrical current is produced which flows through the bipolar plate 119.

The further openings 132 and 134 of the plate represent supply and discharge openings for hydrogen. These openings are separated at the upper and lower sides 112 and 113 of the bipolar plate in FIG. 10 by regions of the plate lying in the plane of the frame 114 from the air supply and discharge openings 120 and 124 and from the correspondingly recessed regions 122 and 126 and are sealed relative to the latter and to the environment.

At the lower side 136 of the plate 119 there are provided recessed channel regions in accordance with FIG. 10, in an arrangement inverted relative to FIG. 8, i.e., the two supply openings 132 communicate with a recessed channel region 138 corresponding to the channel region 136 on the upper side of the plate 119, whereas the two discharge openings 134 communicate with a (non-illustrated) recessed channel region, which is formed in accordance with the channel regions 122. The channel regions at the lower side 136 of the plate 119 communicate with the longitudinal channels 140 formed in the lower side of the plate, so that hydrogen can flow from the supply openings 132 to the discharge openings 134.

As shown in FIG. 11, the lower side of the bipolar plate 119 belongs to the neighboring fuel cell and delivers protons to the membrane 142 of this cell, with the protons passing through the membrane and being reacted with atmospheric oxygen in the adjacent reaction chamber, whereby power is produced on the one hand and water is generated on the other hand. The air flow in the neighboring cell is made available by the lower bipolar plate 119 shown there in precisely the same way as by the bipolar plate 119 of FIG. 8. In known manner, a fuel cell consisting of an anode (here the plate 116), a cathode (here the plate 118) and between them an electrolyte in the form of a membrane (here the membrane 142) exists between two adjacent bipolar plates 119, with the plates 116, 118 and the membrane lying between them forming the above-mentioned so-called MEA.

The shaping of the bipolar plate 119 of FIGS. 8 to 10 is produced here by an etching process and the plate is subsequently provided with a protective coating which consists in this example of three individual layers which will subsequently be described in more detail in connection with FIG. 12. It should be noted that this protective coating is first applied, after manufacturing the bipolar plate through an etching process, in a treatment chamber by a sputter process following the etching process, as will be later explained in more detail in connection with FIG. 8. As a result of the application in a treatment chamber by a sputtering process, this coating is present on all surface regions of the bipolar plate, i.e., not only the region of the channels 126 and 132, but rather also at the outer side edges and at the side edges of the supply and discharge openings 118 and 122.

Figure 12:
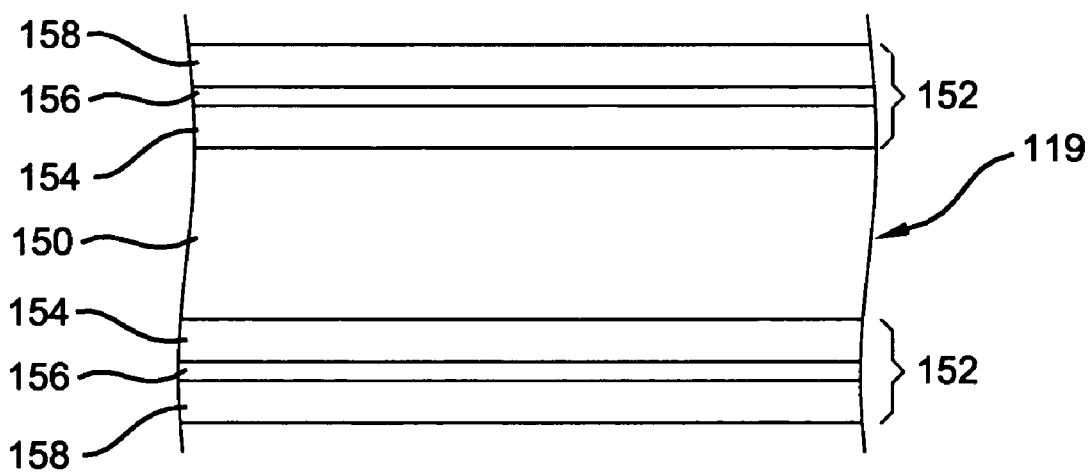
FIG. 12 is an enlarged representation of a region of the bipolar plate of FIG. 8 in order to show details of the protective coating of the invention.

FIG. 12 shows in a purely schematic representation, which is not drawn true to scale, a section of the bipolar plates of FIGS. 8 to 10, for example, in the edge region 112. The bipolar plate comprises a substrate 150 in the form of a sheet metal part which has a protective coating 152 at both sides. The protective coating comprises in this example three layers 154, 156 and 158. The first layer 154 is a coating, of tin oxide with a thickness of 40 nm. The second layer 146 is a layer of silver with a thickness of 10 nm, whereas the third layer 148 likewise consists of tin oxide and has a thickness of 40 nm.

The silver of the second layer 156 forms a dopant for the two metal oxide layer 154 and 158 of tin oxide and causes them to have an adequate conductivity in order to be able to use the sheet metal part as a bipolar plate in a fuel cell or in an electrolyzer. The substrate 150 consists in this example of copper. It can, however, just as easily consist of aluminum, chrome-plated aluminum, stainless steel, chrome-plated, stainless steel, titanium, titanium alloys or iron-containing compounds, and indeed both with and without metallic coating, with the metallic coating being able to consist of the elements tin, zinc, nickel, chromium or alloys of these materials.

Figure 13:
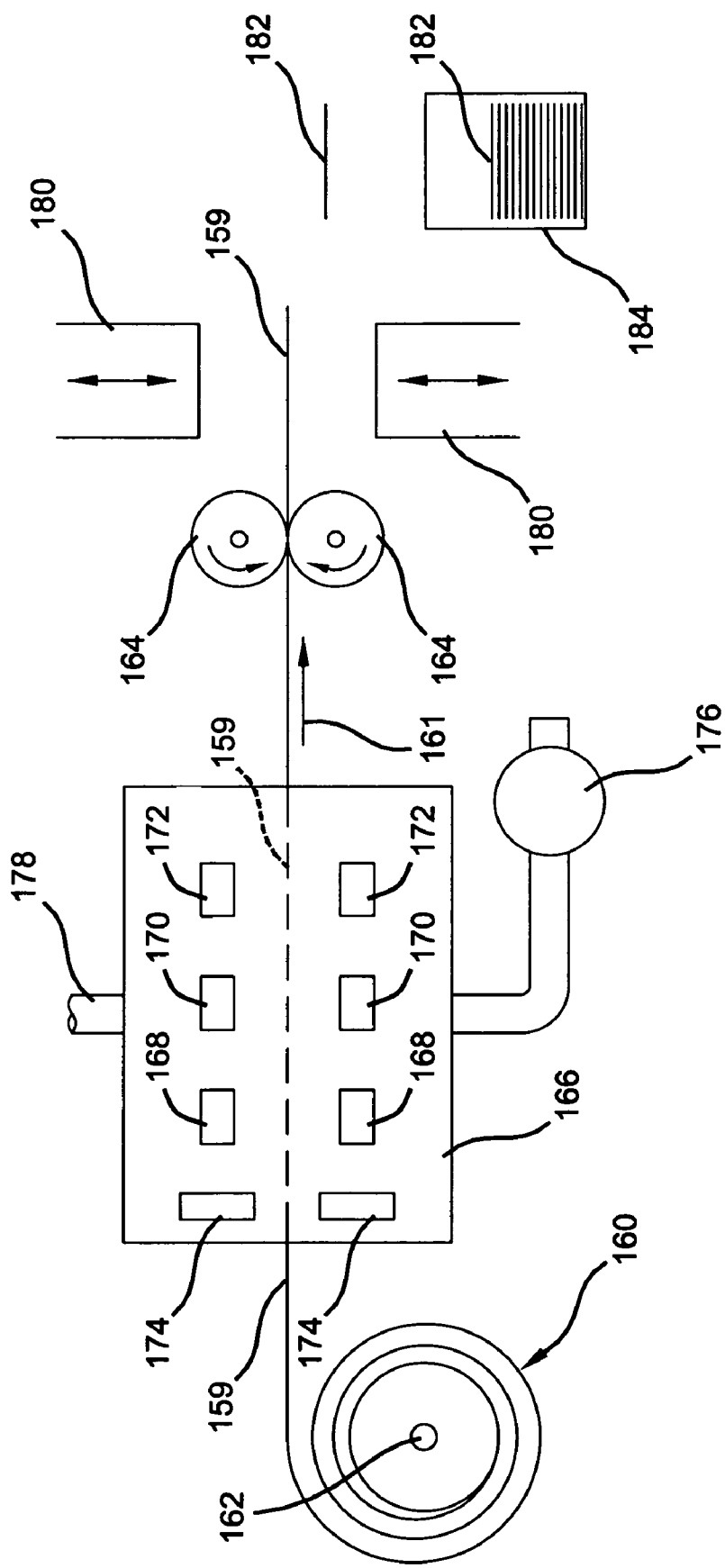
FIG. 13 is a schematic view of a first plan for the production of a sheet metal product in accordance with the invention.

Various possibilities exist for the manufacture from sheet metal of bipolar plates or sheet metal products with a coating in accordance with the invention. One possibility is shown in FIG. 13. Here, a sheet metal strip 159 is present in the form of a large coil 160 which is rotatably mounted on an axle 162. The sheet metal strip is continually unwound from this coil 160, for example, by the draw rolls 164, and is drawn through a treatment chamber 166 sealed off relative to the environment. This treatment chamber is a plant known per se for carrying out PVD processes, with the chamber, for example, containing three respective sputter cathodes 168, 170 and 172 above and below the sheet metal strip 168. The sputter cathode 168 consists of tin oxide, the sputter cathode 170 of silver and the sputter cathode 172 again of tin oxide. All three sputter sources are operated simultaneously so that on movement of the sheet metal strip 160 through the treatment chamber 166 in the direction of travel 161, the first coating 154 is produced by the sputter cathodes 168, the second coating 156 by the sputter cathodes 170 and the third coating 158 by the sputter cathode 172. The treatment chamber can also have a plasma treatment unit or a unit for ion etching 174 arranged before the sputter cathodes 168, so that the sheet metal strip is freed of impurities prior to the actual coating. In usual manner, the treatment chamber is connected to a vacuum pump 176 and an inert gas, for example, argon, is introduced into the treatment chamber via a supply stub 178.

After leaving the treatment chamber, the sheet metal strip 159 is subdivided by a punching and/or embossing device into individual, for example, rectangular, sheet metal parts 182 which drop into a collecting container 184, or are carefully carried out of the region of the stamping procedure on a conveyor device, for example, in the form of a recirculating rubber belt. The sheet metal parts can be brought by a stamping or embossing device into a form similar to the form of FIGS. 8 to 10 and are then available as bipolar plates 119. Somewhat unfavorable in this connection, however, is that cut edges are provided where the protective coating is missing in the region of the supply discharge openings 120, 132 and 124, 134, respectively. This disadvantage can either simply be tolerated or can be overcome by a subsequent coating. The subsequent coating in these regions can be achieved by a special sputtering treatment or otherwise. In the region of the said openings, it is merely necessary to obtain adequate resistance to corrosion. In these regions, the conductivity of the coating is not important.

Figure 14:
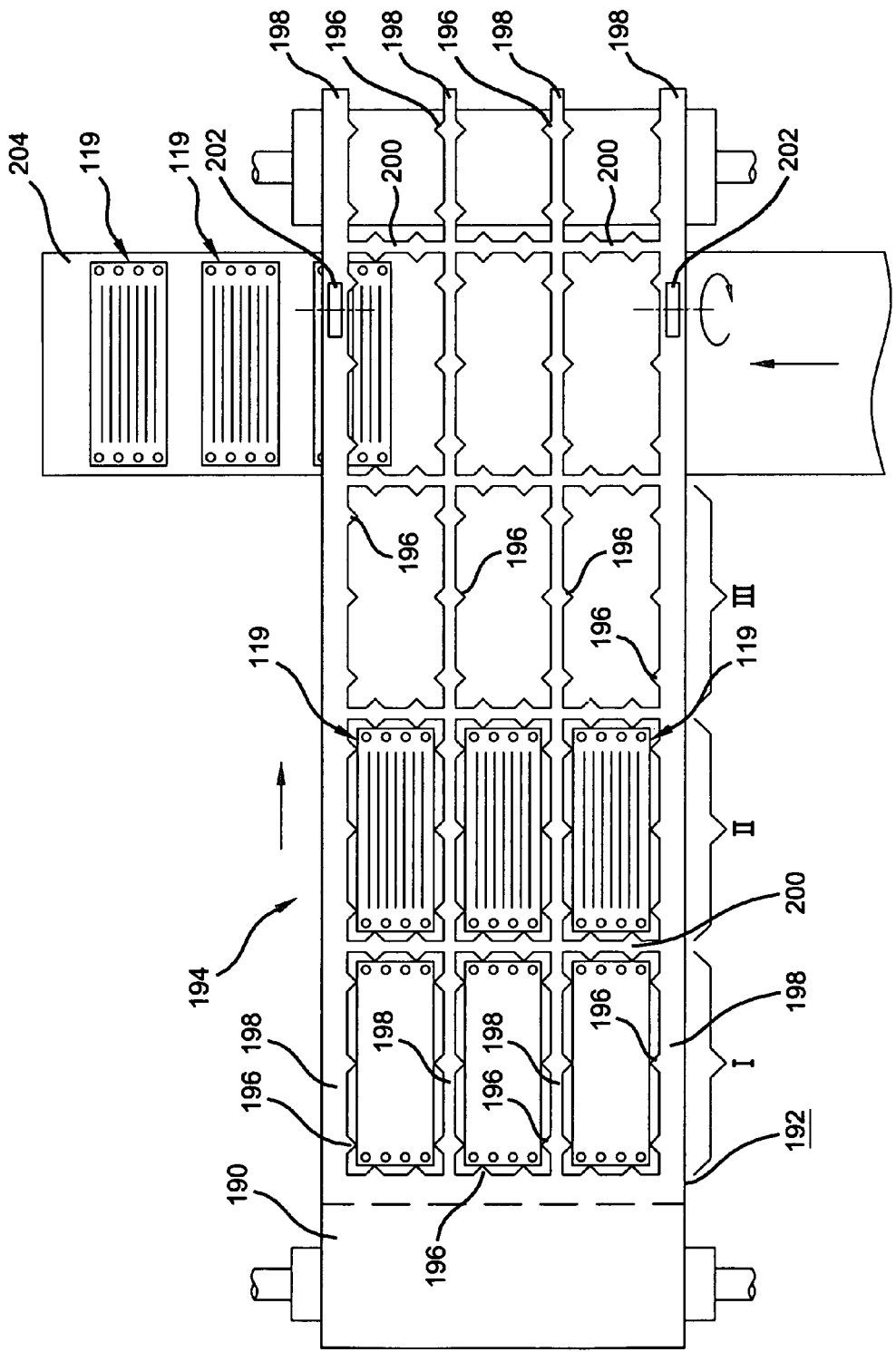
FIG. 14 is a schematic plan view of a strip of sheet metal which passes through progressive tooling in order to produce a bipolar plate in accordance with the invention.

Another possibility of manufacturing the bipolar plates and also avoiding this subsequent treatment is shown in FIG. 14. A sheet metal strip 192 is also unwound in this case from a coil 190 and is drawn through progressive tooling 194, which here includes three working stations I, II and III. In the working station I, a stamping process is carried out in order to produce, in this example, three shaped sheet metal parts disposed alongside one another which each have in principle the same outer shape as the bipolar plates in FIGS. 8 to 10 and which are also provided with the supply and discharge openings 120, 132 and 124, 134, respectively. The individual, shaped sheet metal parts are, however, connected via small lugs 196 to one another and to the guide strips 198 and transverse webs 200 of the sheet metal strip 192, so that the strip can be transported from station to station through the progressive tooling. The transport of the sheet metal strip can, for example, take place, as shown here, by draw rolls 202 driven by a stepping motor which engage the marginal regions of the strip. In the second station II, a coining or embossing process is carried out in order to define, by shaping of the bipolar plates, regions which satisfy the functions of the flow passages 128 and 140 and of the connection passages 122, 126 and 138, respectively.

Figure 15:
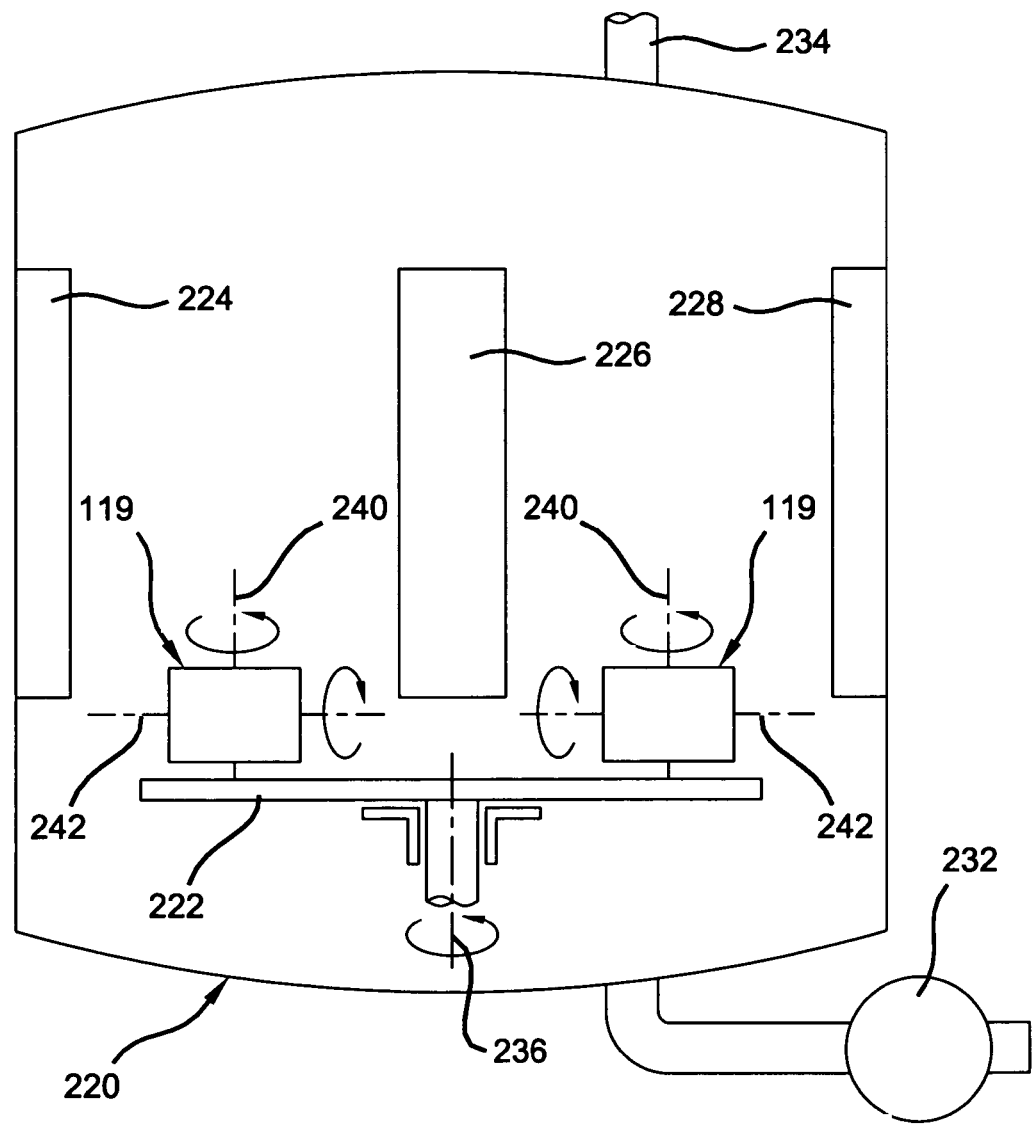
FIG. 15 is a schematic representation of a coating chamber for the coating of sheet metal parts for the formation of bipolar plates in accordance with the invention.

In the third station III, the shaped sheet metal parts are separated from one another and from the sheet metal strip 192 by shearing at the lugs 196 and then dropped after the progressive tooling, for example, onto a transverse belt 204, which brings them to a coating plant, for example, a coating plant of the kind shown in FIG. 15. The remainder of the strip can then either be coiled up, as shown at 206, or, as sometimes customary in progressive tooling, cut up into small parts which are then disposed off as scrap. A further possibility of coating lies in inserting a coating chamber such as 166 in FIG. 13 between the station III and the transverse belt, so that the coated bipolar plates drop in the finished state onto the transverse belt 204.

The individual plates 119 which are produced in the plant of FIG. 14 are now removed from the transverse belt and arranged in a treatment chamber 220 in accordance with FIG. 15 on a rotatable carrier 222, with only two such shaped sheet metal parts being shown in FIG. 15 for the sake of illustration. Within the chamber there are four sputter cathodes of which only three are shown, namely, the sputter cathode 224, 226 and 228, with the fourth cathode lying opposite to the cathode 226 and thus not being visible in the drawing of FIG. 15 because it is located in front of the plane of the drawing.

The reference numeral 232 points to a vacuum pump which is necessary to produce a vacuum in the treatment chamber 220, whereas the supply stub 234 serves for the supply of an inert gas, such as argon, or of a reactive gas, such as acetylene or oxygen, insofar as reactive sputtering is intended.

The cathodes 224 and 228 consist of tin oxide, whereas the cathode 226 and the cathode opposite to it consist of silver. All sputtering cathodes are formed as imbalanced magnetrons, so that in operation a vapor flux of tin, oxygen and silver ions and atoms arises and deposits onto the shaped sheet metal parts on all surfaces in the form of coatings of $SnO_2$ and Ag, respectively. The shaped sheet metal parts are rotated with the rotary plate 222 about the axis 236 of the rotary plate and can also be rotated about further axes such as 240 and 242 by further turning devices which are carried by the rotary plate, so that all surfaces of the shaped sheet metal parts are exposed to the vapor fluxes from the individual sputter cathodes. The rotation of the rotary plate 222 during the coating process leads to a situation in which alternating layers of tin oxide and silver are formed on the formed sheet metal parts as shown in FIG. 16D. Should one desire a three-layer arrangement in accordance with FIG. 12, this can be produced in that the shaped sheet metal parts are first only exposed to the vapor of the two cathodes 224 and 228, then to the vapor flux of the cathode 226 and subsequently again only to the vapor flux of the two cathodes 224 and 228, i.e., the operating voltages for the individual cathodes which are operated as imbalanced magnetrons are switched on and off.

Another possibility of coating the shaped sheet metal parts lies in moving them on the transverse band through a treatment chamber in accordance with the treatment chamber 166 of the FIG. 13 embodiment.

Instead of producing the coating of tin oxide by wiring a cathode of tin oxide, one can take a cathode of pure tin and introduce oxygen into the atmosphere of the treatment chamber 220 via the supply stub 232. Under the conditions prevailing in the chamber, the oxygen then reacts with the tin ions and atoms to form tin oxide which is then deposited onto the surface of the shaped sheet metal parts. The process can be carried out in the manner which is described in EP-A-0 983 973.

FIGS. 16A-16D now show a series of possibilities for realizing the coating.

The reference numeral 150 indicates in each drawing the substrate which represents a sheet metal part and which can optionally already be structured or first be structured after the coating. When the structuring takes place after the coating, the development of the structuring should be such that the coating is not injured, be it by mechanical processing such as embossing or milling or by chemically supported processes such as etching processes or lithography. If the structuring is produced in such a way that a previously applied coating would be injured, then the structuring must first be carried out and the coating subsequently applied to the structured article.

Figure 16A:
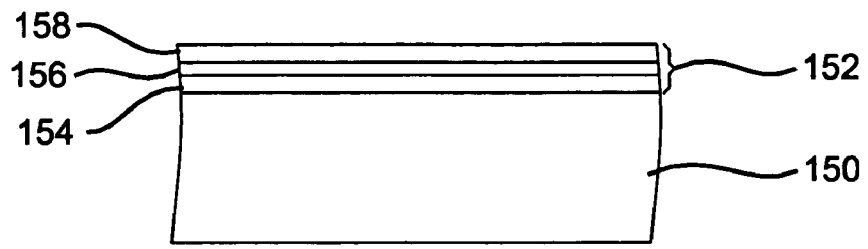
FIGS. 16A-16D show cross-sections similar to FIG. 12 in order to illustrate alternative coatings.

In FIG. 16A the coating 152 consists of the same three layers 154, 156 and 158 as the coating of FIG. 12 with the difference that the protective coating is applied only to the one side of the substrate of the sheet metal part 160, for example when it is the terminal or outside plate of a single fuel cell which only needs to be protected at one side against corrosion.

Figure 16B:
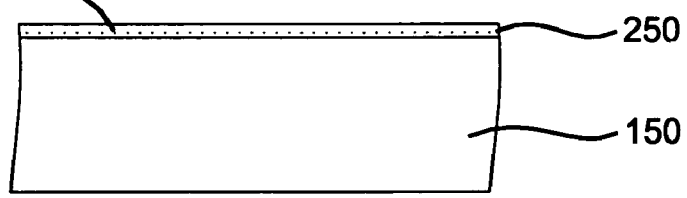

In FIG. 16B the coating is present in the form of a thin (less than 10 nm) layer of tin oxide 250, which consists of a homogenous distribution of dopants in the form of one or more elements of the group aluminum, chromium, silver, boron, fluorine, antimony, chlorine, bromine, phosphorus, molybdenum and/or carbon. These dopants are indicated in the drawing by dots and by the reference numeral 252.

Figure 16C:
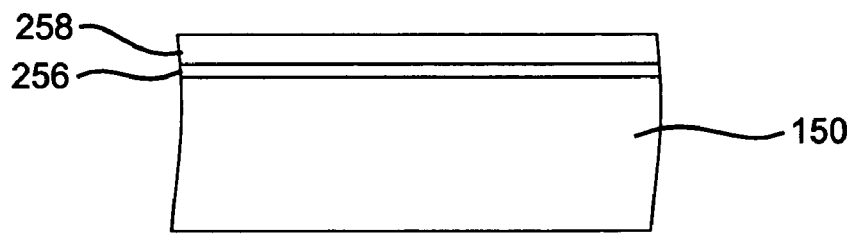
Figure 16D:
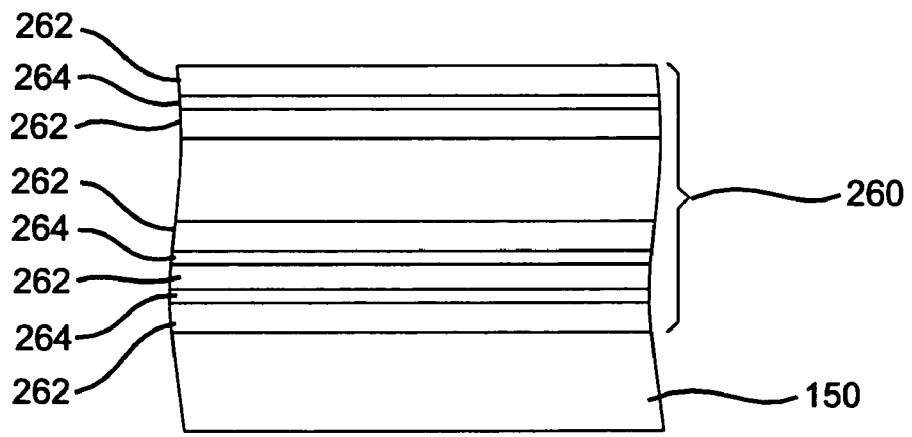

In FIG. 16C, 150 designates the same substrate, but here with a coating which consists of only two layers, namely a lower layer 256 of silver and an upper layer 258 of tin oxide.

Instead of silver, the layer 256 can comprise a further element of the group aluminum, chromium, silver, antimony and/or molybdenum. Since the layer 256 is a metallic layer, this layer can be deposited by a galvanic method instead of by using a PVD process in a treatment chamber. In this example, the layer 256 can, for example, have a thickness in the range between 1 and 500 nm and the layer 258 can have a thickness in the region between 1 and 500 nm.

FIG. 16D shows the substrate 150 with an alternating layer sequence 260 of layers of tin oxide 262 and of silver 264, with the uppermost layer consisting of tin oxide. A multilayer arrangement of this kind arises when a shaped sheet metal part is coated in a treatment chamber in accordance with FIG. 15, and indeed automatically as a result of the rotation of the rotary plate 222.

In the examples of FIGS. 16A-16D, the coatings are provided only on the upper side of the substrate 150. They could, however, additionally be realized in precisely the same manner on the lower side of the substrate.

Although in all previous examples the metal oxide is realized by tin oxide, it could also be zinc oxide or indium oxide, with oxides of alloys of the three named elements tin, zinc and indium (i.e., at least two of these elements) also entering into consideration. For the substrates 150, various sheet metal parts can be considered, namely sheet metal parts comprising aluminum, chrome-plated aluminum, copper, stainless steel, chrome-plated stainless steel, titanium, titanium alloys and iron-containing compounds, both with and without metallic coating, with the metallic coating comprising the elements tin, zinc, nickel, chrome or alloys of these materials.

When the coating consists of tin or zinc, it is conceivable that these could be treated in such a manner to produce the oxide layer directly on the article by reactions between oxygen ions and the coating.

The coating of the invention facilitates use of relatively cheap and easily machinable metals, such as aluminum, titanium, and stainless steel as bipolar plate metals. Particularly in the case of aluminum, the required thickness of noble metal coatings for proper corrosion protection is very costly. Stainless steel and titanium on the other hand are largely resistant to corrosion, but a rapid formation of insulating oxides with a concomitant increase in contact resistance renders these materials commercially unattractive without protective coatings. Hence a relatively low-cost, conductive, and corrosion resistant coating provided by the present invention applied to aluminum, titanium, and stainless steel is highly desirable.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A fuel cell comprising:
    a solid polymer electrolyte having a permeable body containing a cation exchange membrane;
    an electrode in electrical communication with said electrolyte; and
    an electrically conductive contact element having a major working surface facing said electrode that defines a plurality of reactant gas channels separated by a plurality of lands, said electrically conductive contact element having an electrically conductive coating deposited on and contiguously covering said plurality of lands of said major working surface, wherein said electrically conductive coating includes a doped metal oxide composition which has a resistivity of less than 0.001 ohm-cm, and wherein said electrically conductive coating provides electrical conductivity between said plurality of lands and said electrode, and wherein said coating provides a protective layer on said contact element from direct contact with a reactant gas in said plurality of reactant gas channels.

2. The fuel cell of claim 1 wherein said electrode is a catalytic electrode on one major face of the membrane, and wherein said coating comprises fluorine doped tin oxide.

3. The fuel cell of claim 1 wherein said electrically conductive contact element comprises a metal substrate which is susceptible to corrosion, and said coating is a corrosion-resistant protective coating which protects said metal substrate from a corrosive environment of the fuel cell.

4. The fuel cell of claim 1 wherein said electrically conductive contact element comprises a substrate formed of electrically conductive particles dispersed in a binder matrix, and said coating provides electrical contact between said substrate and said electrode.

5. The fuel cell of claim 1 wherein said electrically conductive contact element comprises a matrix of compacted graphite flakes impregnated with a filler.

6. The fuel cell of claim 1 wherein said electrically conductive contact element comprises a conductive substrate, a layer of conductive open cell foam having a first face facing said substrate and a second face facing said electrode, and wherein said coating is deposited on and covers at least one of said first face or said second face of said foam layer.

7. The fuel cell of claim 6 wherein said open cell foam has external surfaces and internal surfaces defined by openings in said open cell foam, and wherein said coating is deposited on and covers said internal and external surfaces.

8. The fuel cell of claim 7 wherein said foam has a thickness between said first and second faces, and said coating is present on said internal and external surfaces throughout said thickness.

9. The fuel cell of claim 8 wherein said coating is deposited on and covers a surface of said substrate facing said foam.

10. The fuel cell of claim 6 wherein said substrate is a metal sheet and said foam is a metal foam.

11. The fuel cell of claim 10 wherein said metal sheet is welded or braised to said metal foam.

12. The fuel cell of claim 1 which further includes an electrically conductive porous material disposed between said electrode and said coated electrically conductive contact element, and wherein said porous material is selected from the group consisting of carbon paper, carbon cloth and metal screen.

13. The fuel cell of claim 1 wherein said electrically conductive contact element is a fluid distribution element, comprising:
    an electrically conductive substrate having first and second major working surfaces, and a flow field at said first major working surface for distributing fluid along said first major working surface, and wherein said coating is deposited on and covers said first major working surface.

14. The fuel cell of claim 13 wherein said coating comprises fluorine doped tin oxide.

15. The fuel cell of claim 13 wherein said substrate is selected from the group consisting of titanium, stainless steel, aluminum, a composite of electrically conductive particles dispersed in a binder matrix; and compacted graphite flakes impregnated with a filler.

16. The fuel cell of claim 13 wherein said flow field comprises a layer of electrically conductive open cell foam.

17. The fuel cell of claim 16 wherein said foam is conductive graphite foam or conductive metallic foam.

18. The fuel cell of claim 13 wherein said plurality of channels is formed in said first major working surface, and wherein said flow field comprises said plurality of channels in said first major working surface.

19. The fuel cell of claim 13 wherein said flow field comprises said plurality of lands.

20. The fuel cell of claim 13 which comprises a second flow field at said second major working surface.

21. The fuel cell of claim 20 wherein said second flow field comprises a series of lands defining a plurality of grooves for distributing coolant fluid along said second major working surface.

22. The fuel cell of claim 14 wherein the fluorine content of said fluorine doped tin oxide is less than 10 weight percent.

23. The cell of claim 1 further comprising an ion conducting electrolyte, said electrode facing the electrolyte, and said electrically conductive contact element in contact with said electrode for conducting electrical current to said electrode.

24. The cell of claim 23 wherein said electrically conductive coating comprises fluorine doped tin oxide.

25. The cell of claim 24 wherein said electrically conductive contact element comprises a metal substrate which is susceptible to corrosion, and said coating is a corrosion-resistant protective coating which protects said metal substrate from the corrosive environment of the cell.

26. The electrochemical cell of claim 1 wherein said electrically conductive contact element comprises a bipolar plate including a sheet metal product having said coating which is a corrosion-resistant protective coating including a metal oxide composition having a treatment which ensures conductivity.

27. The cell of claim 26 wherein the treatment has been carried out in order to produce a crystal structure of the metal oxide composition coating which ensures conductivity.

28. The cell of claim 26 wherein the treatment takes the form of a galvanic coating consisting of one of the elements aluminum, chromium, silver, antimony or molybdenum applied directly below the metal oxide composition coating.

29. The cell of claim 26 wherein the treatment is executed as a doping.

30. The cell of claim 29 wherein the protective coating consists of at least one layer.

31. The cell of claim 29 wherein the protective coating comprises an oxide of one of the following elements or alloys of these elements: tin, zinc, indium.

32. The cell of claim 29 wherein the protective coating comprises a first layer of a metal oxide, a second layer of a dopant which ensures conductivity, and a third layer of a metal oxide.

33. The cell of claim 26 wherein the protective coating comprises an alternating layer sequence of metal oxide composition and dopants which ensure conductivity.

34. The cell of claim 26 wherein the protective coating comprises at least two layers.

35. The cell of claim 29 wherein the doping which ensures the conductivity comprises at least one element of the group aluminum, chromium, silver, boron, fluorine, antimony, chlorine, bromine, phosphorus, molybdenum and/or carbon.

36. The cell of claim 26 wherein the protective coating comprises a protective coating deposited in a vacuum chamber.

37. The cell of claim 26 wherein the protective coating has a thickness in the range between 1 monolayer and 1μ, preferably between approximately 1 nm and approximately 500 nm.

38. The cell of claim 26 wherein the sheet metal comprises aluminum, chrome-plate aluminum, copper, stainless steel, chrome-plated stainless steel, titanium, titanium alloys and iron-containing compounds both with and without metallic coating, with the metallic coating including at least one of the elements tin, zinc, nickel, chromium or alloys of these materials.

39. The cell of claim 26 wherein the sheet metal product has a thickness in the range from about 0.001 mm to about 5 mm.

40. The cell of claim 1 wherein said metal oxide composition comprises metal oxide treated to ensure conductivity.

41. The cell of claim 1 wherein the said metal oxide composition comprises a doped metal oxide.

42. The cell of claim 1 wherein the metal oxide composition comprises an oxide of an element or alloy of an element selected from the group consisting of tin, zinc, indium, and mixtures thereof.

43. The cell of claim 42 wherein said doped metal oxide comprises a dopant which is selected from the group consisting of aluminum, chromium, silver, boron, fluorine, antimony, chlorine, bromine, phosphorus, molybdenum, carbon, and mixtures thereof.

44. The cell of claim 1 wherein said electrically conductive contact element conducts electrical current to or from said electrode.

45. The cell of claim 2 wherein said electrically conductive contact element conducts current from said electrode.

46. The cell of claim 23 wherein said electrically conductive contact element conducts current to said electrode.

47. An electrochemical cell comprising an electrode and an electrically conductive contact element facing said electrode for conducting electrical current, wherein said electrically conductive contact element has an electrically conductive and corrosion-resistant protective coating which comprises a doped metal oxide.

48. The method of claim 47 wherein said electrically conductive contact element comprises a substrate and said layer overlies said substrate.

49. A cell of claim 47 wherein said doped metal oxide is an oxide of an element or alloy of an element selected from the group consisting of tin, zinc, indium, and mixtures thereof.

50. The cell of claim 47 wherein said doped metal oxide comprises a dopant selected from the group consisting of aluminum, chromium, silver, boron, fluorine, antimony, chlorine, bromine, phosphorus, molybdenum, carbon and mixtures thereof.

51. A fuel cell comprising a solid polymer electrolyte having a permeable body containing a cation exchange membrane, an electrode in electrical communication with said electrolyte, a gas diffusion member, and an electrically conductive contact element having a major working surface facing said electrode that defines a plurality of reactant gas channels separated by a plurality of lands, said electrically conductive contact element having an electrically conductive coating deposited on and contiguously covering said plurality of lands of said major working surface, wherein said electrically conductive coating includes a doped metal oxide composition which has a resistivity less than 0.001 ohm-cm, and wherein said coating is in direct contact with said gas diffusion member and provides electrical conductivity between said plurality of lands and said electrode, and wherein said coating provides a protective layer on said contact element from direct contact with a reactant gas in said plurality of reactant gas channels.

52. The fuel cell of claim 51 wherein said coating comprises fluorine doped tin oxide.

53. The fuel cell of claim 52 wherein the fluorine content of said fluorine doped tin oxide is less than 10 weight percent.

54. The fuel cell of claim 51 wherein said electrically conductive contact element comprises a metal substrate which is susceptible to corrosion from said reactant gas and said coating is a corrosion-resistant protective coating which protects said metal substrate from a corrosive environment of the fuel cell.

* * * * *